United States Patent
Lee et al.

(10) Patent No.: US 12,494,257 B2
(45) Date of Patent: Dec. 9, 2025

(54) MEMORY DEVICE INCLUDING STRING SELECT TRANSISTORS HAVING DIFFERENT THRESHOLD VOLTAGES AND METHOD OF OPERATING THE MEMORY DEVICE

(71) Applicant: SAMSUNG ELECTRONICS CO., LTD., Suwon-si (KR)

(72) Inventors: Yohan Lee, Suwon-si (KR); Jaeduk Yu, Suwon-si (KR); Sangsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 18/409,344

(22) Filed: Jan. 10, 2024

(65) Prior Publication Data

US 2024/0282383 A1  Aug. 22, 2024

(30) Foreign Application Priority Data

Feb. 21, 2023 (KR) .................. 10-2023-0023146

(51) Int. Cl.
*G11C 11/34* (2006.01)
*G11C 16/04* (2006.01)
(Continued)

(52) U.S. Cl.
CPC .......... *G11C 16/16* (2013.01); *G11C 16/0483* (2013.01); *G11C 16/10* (2013.01); *G11C 16/26* (2013.01)

(58) Field of Classification Search
CPC ..... G11C 16/16; G11C 16/14; G11C 16/3445; G11C 16/344; H01L 27/115
(Continued)

(56) References Cited

U.S. PATENT DOCUMENTS 8,649,219 B2   2/2014  Li et al.
9,111,617 B2   8/2015  Shim et al.
(Continued)

OTHER PUBLICATIONS

Communication dated May 8, 2024, issued by the European Patent Office in counterpart European Application No. 24151362.1.

*Primary Examiner* — Son T Dinh
(74) *Attorney, Agent, or Firm* — Sughrue Mion, PLLC

(57) ABSTRACT

A memory device including: a memory cell array including a plurality of memory blocks; a voltage generator configured to generate an erase voltage and row line voltages to be provided to a target block of the plurality of memory blocks on which an erase operation is to be performed; and a control logic circuit configured to control the memory cell array and the voltage generator, wherein, during the erase operation, after a precharge voltage is applied to a plurality of string select lines connected to the target block, the control logic circuit is further configured to provide the erase voltage to a plurality of bit lines connected to the plurality of string select lines, wherein the plurality of string select lines includes a first string select line and a second string select line, wherein a first distance between the first string select line and ends of a plurality of word lines connected to the target block is less than a second distance between the second string select line and the ends of the plurality of word lines, and wherein a first threshold voltage of a first transistor connected to the first string select line is higher than a second threshold voltage of a second transistor connected to the second string select line.

20 Claims, 22 Drawing Sheets

(51) Int. Cl.
*G11C 16/10* (2006.01)
*G11C 16/16* (2006.01)
*G11C 16/26* (2006.01)

(58) Field of Classification Search
USPC .................................... 365/185.29, 203, 63
See application file for complete search history.

(56) References Cited

U.S. PATENT DOCUMENTS

| | | |
|---|---|---|
| 9,379,130 B2 | 6/2016 | Mikajiri |
| 10,014,061 B1 | 7/2018 | Yip et al. |
| 10,510,771 B2 | 12/2019 | Nam et al. |
| 10,593,691 B2 | 3/2020 | Umezawa et al. |
| 10,784,275 B1 | 9/2020 | Maejima |
| 2016/0141045 A1* | 5/2016 | Shim ...................... G11C 16/08 365/185.11 |
| 2017/0140829 A1 | 5/2017 | Park et al. |
| 2019/0221267 A1 | 7/2019 | Ko et al. |
| 2022/0293180 A1 | 9/2022 | Lee et al. |
| 2022/0392918 A1* | 12/2022 | Choi ................. H01L 21/02565 |
| 2023/0116928 A1 | 4/2023 | Park et al. |

* cited by examiner

MEMORY DEVICE INCLUDING STRING SELECT TRANSISTORS HAVING DIFFERENT THRESHOLD VOLTAGES AND METHOD OF OPERATING THE MEMORY DEVICE

CROSS-REFERENCE TO RELATED APPLICATION

This application is based on and claims priority under 35 U.S.C. § 119 to Korean Patent Application No. 10-2023-0023146, filed on Feb. 21, 2023, in the Korean Intellectual Property Office, the disclosure of which is incorporated by reference herein in its entirety.

BACKGROUND

1. Field

The disclosure relates to a memory device, and more particularly, to a memory device including string select transistors having different threshold voltages and a method of operating the memory device.

2. Description of Related Art

Memory devices may be used to store data and may be classified into volatile memory devices and non-volatile memory devices. According to the demand for high capacity and miniaturization of non-volatile memory devices, a three-dimensional memory device including a plurality of channel holes, which may be for example a plurality of channel structures, extending in a vertical direction on a substrate has been developed. In order to further improve the degree of integration of the three-dimensional memory device, the number of channel holes, or for example channel structures, included in each memory block may be further increased. In the case of a non-volatile memory device having such a multi-hole structure, a performance difference may occur due to differences in intrinsic characteristics of channel holes, or for example channel structures. An erasing techniques for the three-dimensional memory device may include a gate induced drain leakage (GIDL) erasing technique.

SUMMARY

Provided are a memory device for compensating for a performance difference due to a characteristic difference between channel holes by including string select transistors having different threshold voltages, and a method of operating the memory device.

Additional aspects will be set forth in part in the description which follows and, in part, will be apparent from the description, or may be learned by practice of the presented embodiments.

In accordance with an aspect of the disclosure, a memory device includes: a memory cell array including a plurality of memory blocks: a voltage generator configured to generate an erase voltage and row line voltages to be provided to a target block of the plurality of memory blocks on which an erase operation is to be performed; and a control logic circuit configured to control the memory cell array and the voltage generator, wherein, during the erase operation, after a precharge voltage is applied to a plurality of string select lines connected to the target block, the control logic circuit is further configured to provide the erase voltage to a plurality of bit lines connected to the plurality of string select lines, wherein the plurality of string select lines includes a first string select line and a second string select line, wherein a first distance between the first string select line and ends of a plurality of word lines connected to the target block is less than a second distance between the second string select line and the ends of the plurality of word lines, and wherein a first threshold voltage of a first transistor connected to the first string select line is higher than a second threshold voltage of a second transistor connected to the second string select line.

In accordance with an aspect of the disclosure, a method of operating a memory device including a memory block which includes a plurality of cell strings connected to a plurality of word lines formed in a vertical direction on a substrate, includes: precharging a plurality of string select lines connected to gate terminals of a plurality of string select transistors, wherein the plurality of string select transistors have different threshold voltages and are horizontally adjacent to each other between word line cut regions: providing different voltages to first terminals of a plurality of erase control transistors connected to second terminals of the plurality of string select transistors, by applying an erase voltage to a bit line connected to first terminals of the plurality of string select transistors; and erasing data of the plurality of cell strings by applying an erase control voltage to gate terminals of the plurality of erase control transistors, wherein the plurality of string select lines includes a first string select line and a second string select line, wherein a first distance between the first string select line and ends of the plurality of word lines is less than a second distance between the second string select line and the ends of the plurality of word lines, and wherein a first threshold voltage of a first string select transistor connected to the first string select line is higher than a second threshold voltage of a second string select transistor connected to the second string select line.

In accordance with an aspect of the disclosure, a memory device includes: a plurality of word lines stacked on a substrate in a vertical direction, and extending between word line cut regions: a plurality of erase control lines on the plurality of word lines; a plurality of string select lines on the plurality of erase control lines, wherein the plurality of string select lines includes first string select lines which are closer to the word line cut regions than second string select lines included in the plurality of string select lines; and a memory cell array including a plurality of memory cells connected to the plurality of word lines, a plurality of erase control transistors connected to the plurality of erase control lines, and a plurality of string select transistors connected to the plurality of string select lines, wherein a first threshold voltage of first string select transistors connected to the first string select lines from among the plurality of string select transistors is higher than a second threshold voltage of second string select transistors connected to the second string select lines from among the plurality of string select transistors.

BRIEF DESCRIPTION OF DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS

Hereinafter, various embodiments will be described with reference to the accompanying drawings.

Figure 1:
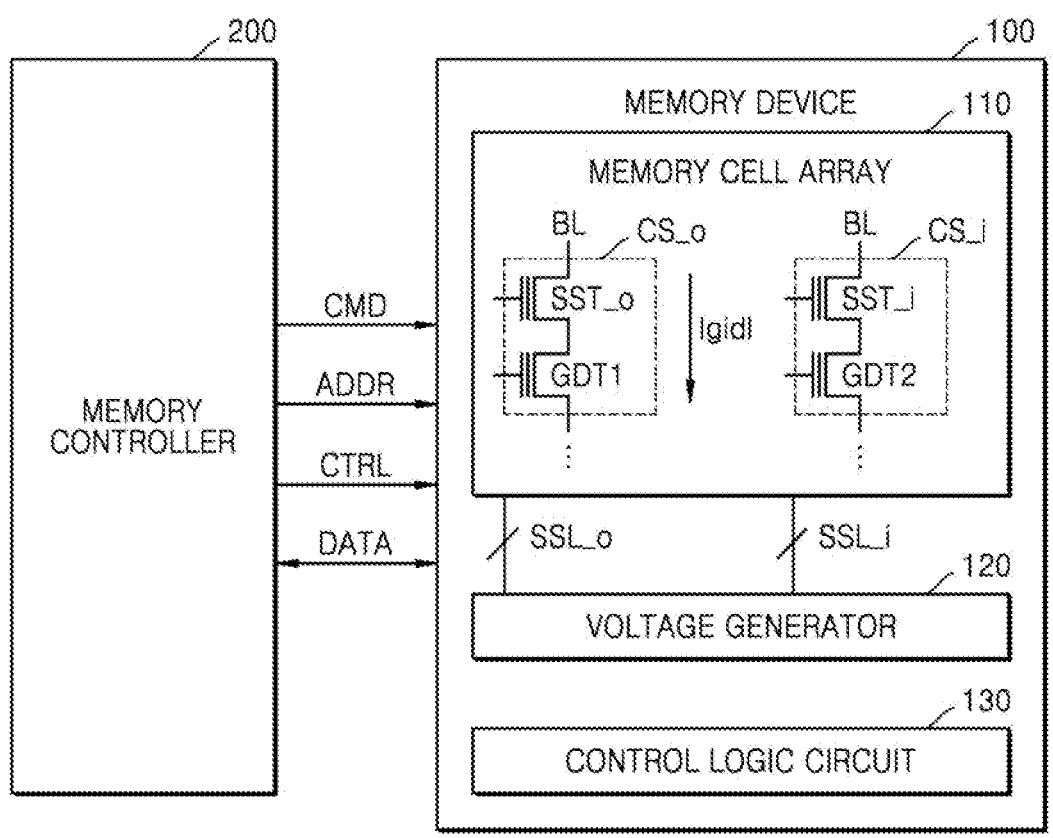
FIG. 1 is a block diagram of a memory system according to an embodiment.

FIG. 1 is a block diagram of a memory system 10 according to an embodiment.

Referring to FIG. 1, the memory system 10 may include a memory device 100 and a memory controller 200, and the memory device 100 may include a memory cell array 110, a voltage generator 120, and a control logic circuit 130. In embodiments, the memory device 100 may be a non-volatile memory device.

The memory controller 200 may control the memory device 100 to read data stored in the memory device 100 or program data into the memory device 100 in response to a read/write request from a host. For example, the memory controller 200 may control program, read, and erase operations of the memory device 100 by providing an address ADDR, a command CMD, and a control signal CTRL to the memory device 100. Also, data DATA, which may be at least one of write data for programming and read data, may be transmitted and received between the memory controller 200 and the memory device 100.

The memory cell array 110 may include a plurality of memory cells. For example, the plurality of memory cells may be flash memory cells. Hereinafter, embodiments relating to a case in which the plurality of memory cells are NAND flash memory cells are described as an example. However, embodiments are not limited thereto, and in some embodiments, the plurality of memory cells may be resistive memory cells, such as resistive RAM (ReRAM), phase change RAM (PRAM), and magnetic RAM (MRAM) cells.

The memory cell array 110 may be connected to the voltage generator 120 through outer string select lines SSL_o and inner string select lines SSL_i aligned between word line cut regions. The outer string select lines SSL_o may be string select lines disposed relatively close to a word line cut region, and the inner string select lines SSL_i may be string select lines disposed relatively far from the word line cut region. For example, in embodiments, the outer string select lines SSL_o may be disposed closer to the word line cut region than the inner string select lines SSL_i. The outer string select lines SSL_o may be connected to the gate terminal of an outer string select transistor SST_o, and the inner string select lines SSL_i may be connected to the gate terminal of an inner string select transistor SST_i. Although two types of string select lines are specified according to the distance from the word line cut region, embodiments are not limited thereto.

Regarding process characteristics, the erase speed of an outer cell string CS_o relatively close to the word line cut region may be faster than the erase speed of an inner cell string CS_i relatively far from the word line cut region. For example, in the outer and inner cell strings CS_o and CS_i formed between the word line cut regions, skew in erase speed may occur. For convenience of description, two cell strings are shown, but embodiments are not limited thereto. The memory cell array 110 may include a plurality of outer cell strings CS_o to which an outer string select line SSL_o is connected, and a plurality of inner cell strings CS_i to which an inner string select line SSL_i is connected.

Referring to FIG. 1, during an erase operation, an erase voltage (e.g., erase voltage Vers in FIG. 12) applied to a bit line BL may drop, or be reduced, by the threshold voltages of the outer and inner string select transistors SST_o and SST_i, and the dropped or reduced erase voltage may be applied to the drains of erase control transistors GDT1 and GDT2. A gate induced drain leakage (GIDL) current Igidl may be generated based on a gate voltage and a drain voltage applied to the erase control transistors GDT1 and GDT2, and an erase operation may be performed on a cell string by the GIDL current Igidl. The magnitude of the GIDL current Igidl may be proportional to the magnitude of the drain voltage of erase control transistors GDT1 and GDT2.

According to an embodiment, threshold voltages of the outer and inner string select transistors SST_o and SST_i may be set to be different in order to compensate for skew in erase speed. For example, the threshold voltage of the outer string select transistor SST_o may be relatively high. Because an erase voltage reduced by the relatively high threshold voltage may be applied to the drain of the erase control transistor GDT1, the magnitude of the GIDL current Igidl caused by the erase control transistor GDT1 may be relatively small. A threshold voltage of the inner string select transistor SST_i may be relatively low. Because an erase voltage reduced by the relatively low threshold voltage may be applied to the drain of the erase control transistor GDT2, the magnitude of the GIDL current Igidl caused by the erase control transistor GDT2 may be relatively large. Because a faster erase speed may be provided as the GIDL current Igidl increases, according to an embodiment, an erase speed deviation for each cell string according to process characteristics may be compensated for by setting the threshold voltages of the outer and inner string select transistors SST_o and SST_i to be different from each other.

The control logic circuit 130 may receive the command CMD, the address ADDR, and the control signal CTRL from the memory controller 200, and may control overall operations of the memory device 100 based on the command CMD, the address ADDR, and the control signal CTRL.

Figure 2:
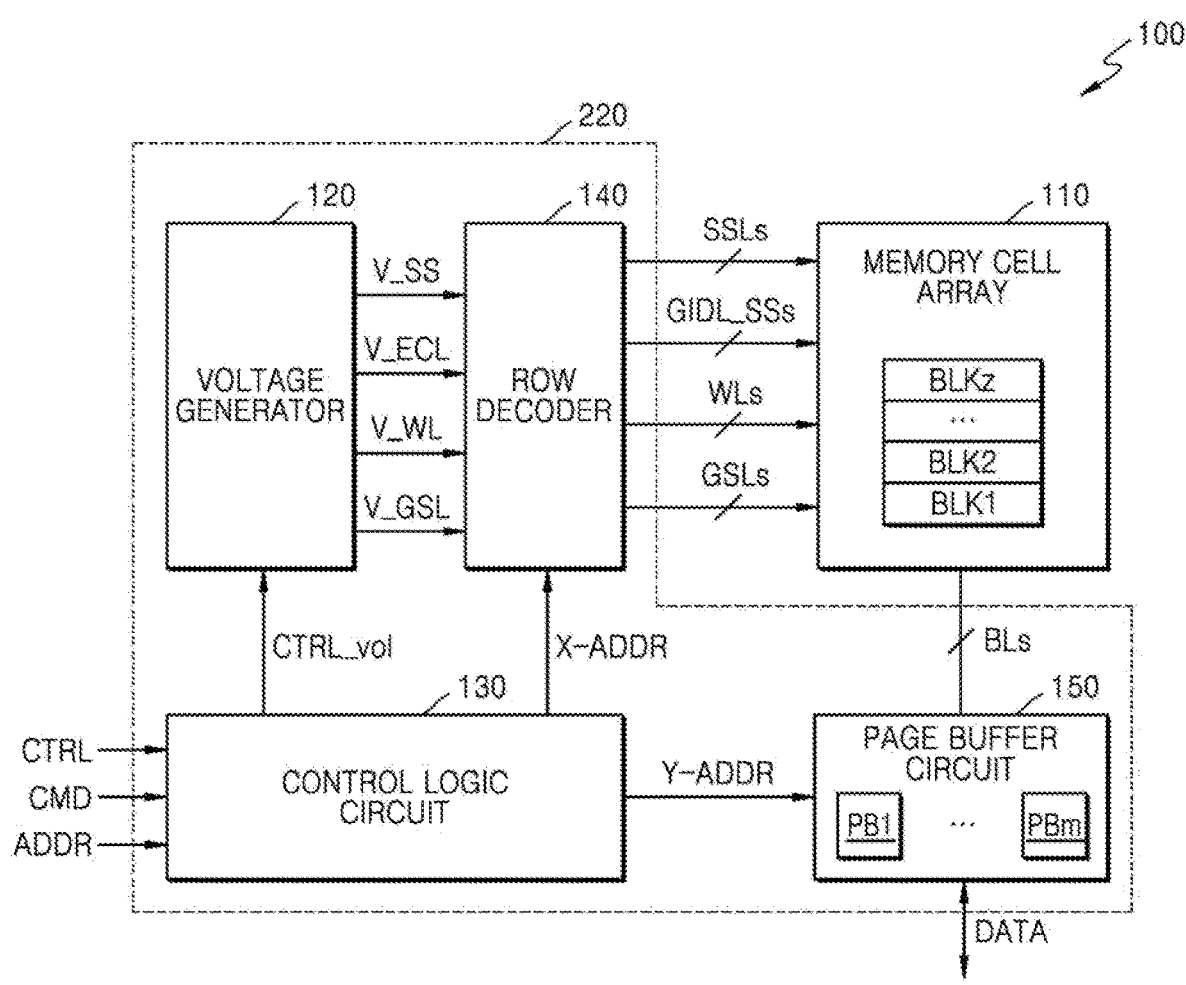
FIG. 2 is a block diagram of a memory device according to an embodiment.

FIG. 2 is a block diagram of a memory device 100 according to an embodiment.

Referring to FIG. 2, the memory device 100 may include a memory cell array 110, a voltage generator 120, a control logic circuit 130, a row decoder 140, and a page buffer circuit 150. In embodiments, the memory device 100 may further include an interface circuit, and the interface circuit may include a data input/output circuit, a command/address input/output circuit, and the like. Also, the memory device 100 may further include a temperature sensor.

The memory cell array 110 may include a plurality of memory blocks BLK1 to BLKz, where z is a positive integer. Each of the plurality of memory blocks BLK1 to BLKz may include a plurality of pages, and each of the plurality of pages may include a plurality of memory cells. For example, a memory block may be a unit of an erase operation, and a page may be a unit of a write operation and a read operation. Each memory cell may store one or more bits. For example, each memory cell may be a single level cell (SLC), a multi-level cell (MLC), a triple level cell (TLC), quadruple level cell (QLC), or the like.

Also, the memory cell array 110 may be connected to a plurality of string select lines SSLs, a plurality of erase control lines GIDL_SS, a plurality of word lines WL, a plurality of ground select lines GSL, and a plurality of bit lines BL. The plurality of string select lines SSL, the plurality of erase control lines GIDL_SS, the plurality of word lines WL, the plurality of ground select lines GSL, and the plurality of bit lines BL may be referred to as row lines. The memory cell array 110 may be connected to the row decoder 140 through the plurality of string select lines SSLs, the plurality of erase control lines GIDL_SS, the plurality of word lines WL, and the plurality of ground select lines GSL and may be connected to the page buffer circuit 150 through the plurality of bit lines BL. In some embodiments, the plurality of string select lines SSL may be divided into a plurality of groups according to a distance from the word line cut region. For example, the plurality of string select lines SSL may be divided into outer string select lines (e.g., outer string select lines SSL_o in FIG. 1) relatively close to the word line cut region and inner string select lines (e.g., inner string select lines SSL_i in FIG. 1) relatively far from the word line cut region. However, embodiments are not limited thereto, and the plurality of string select lines SSLs may be divided into three or more groups according to their distance from the word line cut region.

In an embodiment, the memory cell array 110 may include a three-dimensional (3D) memory cell array, and the 3D memory cell array may include a plurality of cell strings. Each of the cell strings may include memory cells respectively connected to word lines vertically stacked on a substrate. U.S. Pat. Nos. 7,679,133, 8,553,466, 8,654,587, 8,559,235, and U.S. Patent Application Publication No. 2011/0233648 are incorporated herein by reference in their entirety.

The control logic circuit 130 may output various control signals for writing data to, or reading data from, the memory cell array 110, based on the command CMD, the address ADDR, and the control signal CTRL, which are received from the memory controller 200. Accordingly, the control logic circuit 130 may generally control various operations within the memory device 100. For example, the control logic circuit 130 may provide a voltage control signal CTRL_vol to the voltage generator 120, may provide a row address X-ADDR to the row decoder 140, and may provide a column address Y-ADDR to the page buffer circuit 150. However, embodiments are not limited thereto, and the control logic circuit 130 may further provide other control signals to the voltage generator 120, the row decoder 140, and the page buffer circuit 150.

The voltage generator 120 may generate various types of voltages for performing program, read, and erase operations based on the voltage control signal CTRL_vol. For example, the voltage generator 120 may generate row line voltages applied to the row lines, for example, a string select line voltage V_SSL, an erase control line voltage V_ECL, a word line voltage V_WL, and a ground select line voltage V_GSL, and may provide the string select line voltage V_SSL, the erase control line voltage V_ECL, the word line voltage V_WL, and the ground select line voltage V_GSL to the row decoder 140.

For example, the voltage generator 120 may generate a plurality of erase control voltages as the erase control line voltage V_ECL. For example, the voltage generator 120 may generate a program voltage, a read voltage, a program verify voltage, an erase voltage, and the like as the word line voltage V_WL. For example, the voltage generator 120 may generate a selection voltage and a non-selection voltage as the string select line voltage V_SSL. For example, the voltage generator 120 may generate a selection voltage and a non-selection voltage as the ground select line voltage V_GSL. Also, the voltage generator 120 may further generate a bit line voltage and a common source line voltage.

During an erase operation, the row decoder 140 may provide the string select line voltage V_SSL to the plurality of string select lines SSL in response to the row address X_ADDR. During an erase operation, the row decoder 140 may provide the erase control line voltage V_ECL to the plurality of erase control lines GIDL_SS. During an erase operation, the row decoder 140 may provide the word line voltage V_WL to the plurality of word lines WL. During an erase operation, the row decoder 140 may provide the ground select line voltage V_GSL to the plurality of ground select lines GSL.

The page buffer circuit 150 may select at least one bit line from among the plurality of bit lines BL in response to the column address Y_ADDR. The page buffer circuit 150 may operate as a write driver or a sense amplifier according to an operation mode. The page buffer circuit 150 may include a plurality of page buffers PB1 to PBm, where m is a positive integer. For example, m may correspond to the number of bit lines BL, and the plurality of page buffers PB1 to PBm may be respectively connected to the plurality of bit lines BL. For example, the plurality of bit lines BL may be grouped into a plurality of bit line groups, and bit lines included in each of the plurality of bit line groups may share a page buffer.

Figure 3:
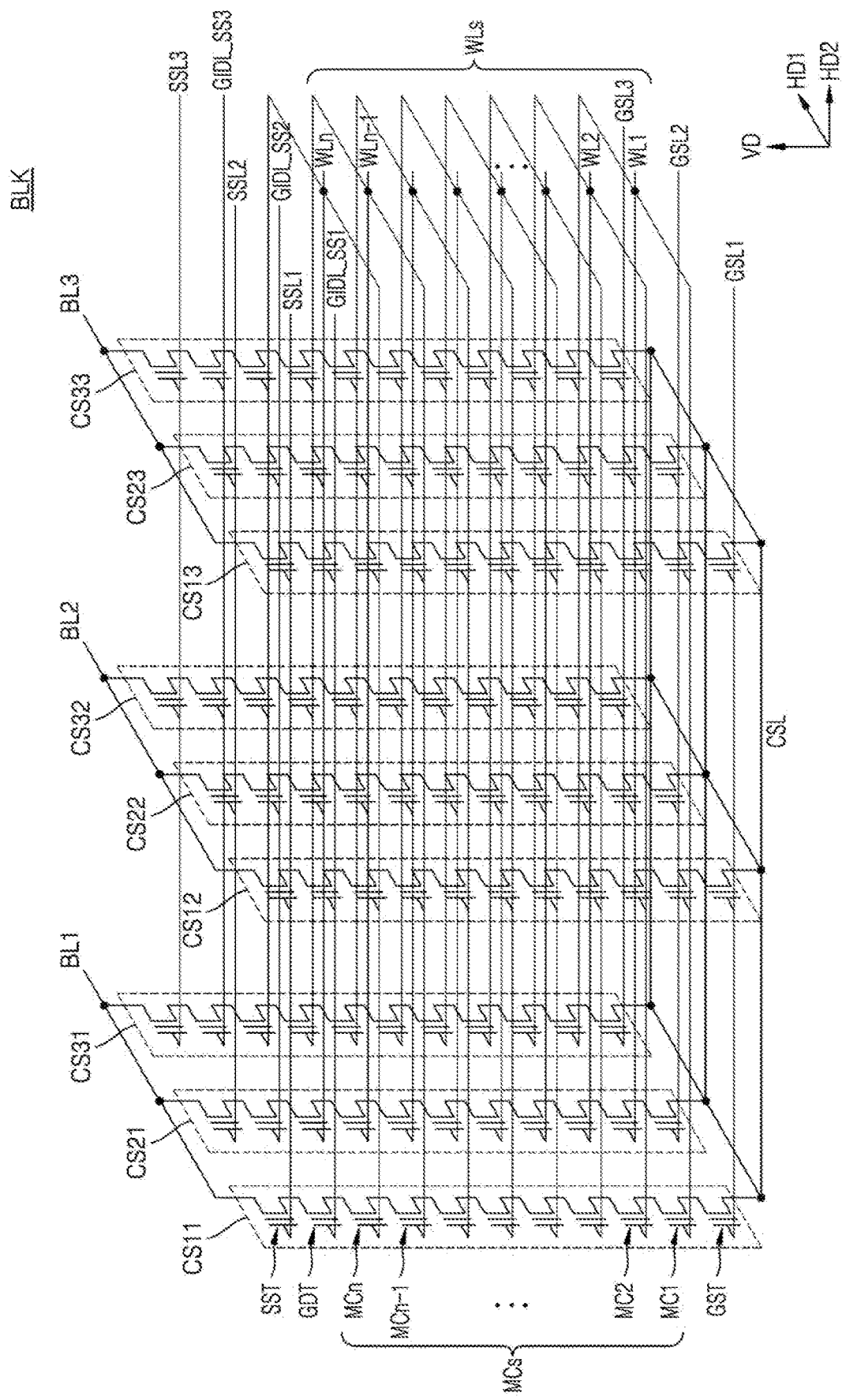
FIG. 3 is a circuit diagram of a memory block according to an embodiment.

FIG. 3 is a circuit diagram of a memory block BLK according to an embodiment.

Figure 5:
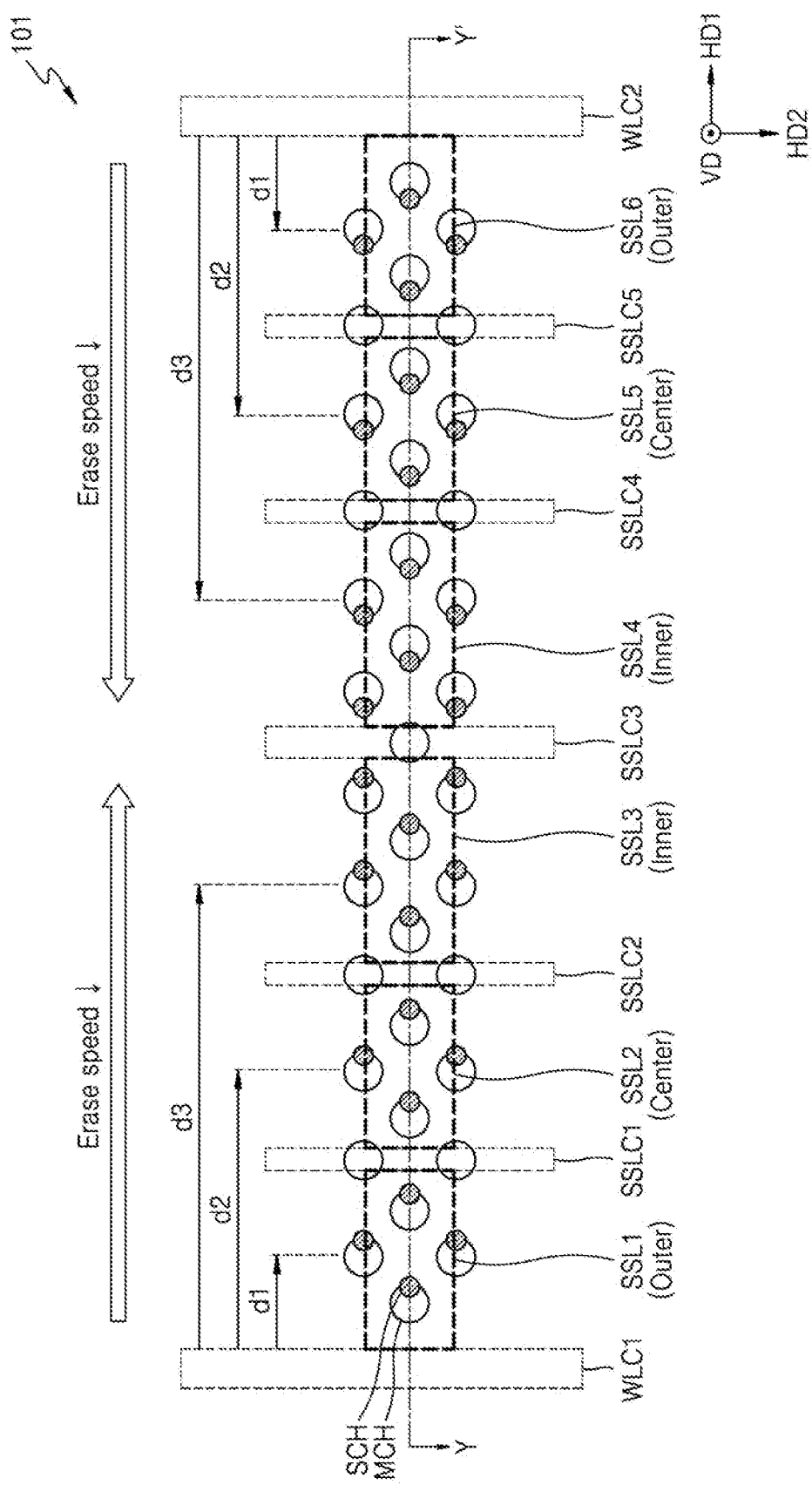
FIG. 5 is a plan view illustrating a memory device according to an embodiment.

Referring to FIG. 3, the memory block BLK may correspond to one of the plurality of memory blocks BLK1 to BLKz of FIG. 2. The memory block BLK may be connected to bit lines BL1 to BL3, erase control lines GIDL_SS1 to GIDL_SS3, string select lines SSL1 to SSL3, word lines WL, and ground select lines GSL1 to GSL3 and may include cell strings CS11 to CS33 extending in a vertical direction VD. Here, the number of cell strings, the number of word lines, the number of bit lines, the number of ground select lines, the number of string select lines, and the number of erase control lines may be variously changed depending on embodiments. For example, the number of string select lines may be 6 as shown in FIG. 5.

The bit lines BL1 to BL3 may extend in a first direction, for example a first horizontal direction HD1, and the word lines WL1 to WLn (where n is a positive integer) may extend in a second direction, for example a second horizontal direction HD2. The cell strings CS11, CS21, and CS31 may be positioned between the bit line BL1 and a common source line CSL, the cell strings CS12, CS22, and CS32 may be positioned between the bit line BL2 and the common source line CSL, and the cell strings CS13, CS23, and CS33 may be positioned between the bit line BL3 and the common source line CSL.

For example, the cell string CS11 may include an erase control transistor GDT, a string select transistor SST, a plurality of memory cells MCs, and a ground select transistor GST, which may be connected in series. The erase control transistor GDT may be connected to an erase control line GIDL_SS1 corresponding thereto. The string select transistor SST may be connected to the string select line SSL1 corresponding thereto and the bit line BL1, and the memory cells MCs may be respectively connected to corresponding word lines WL1 to WLn corresponding thereto. The ground select transistor GST may be connected to the ground select line GSL1 corresponding thereto and the common source line CSL.

Figure 4:
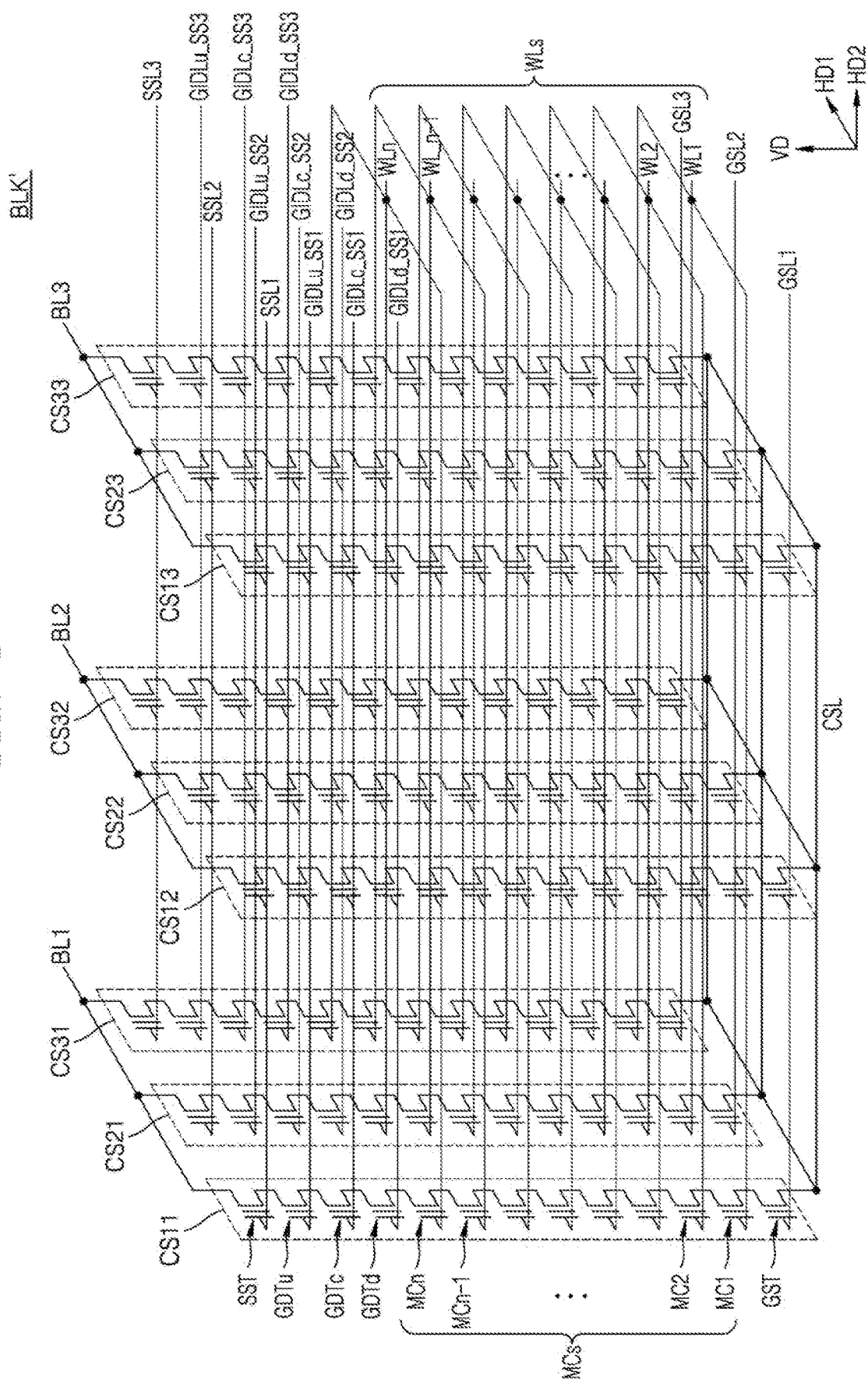
FIG. 4 is a circuit diagram of a memory block according to an embodiment.

FIG. 4 is a circuit diagram of a memory block BLK' according to an embodiment.

Referring to FIG. 4, the memory block BLK' may correspond to one of the plurality of memory blocks BLK1 to BLKz of FIG. 2. The memory block BLK' corresponds to a modification of the memory block BLK of FIG. 3, and hereinafter, differences from the memory block BLK of FIG. 3 may be mainly described. The memory block BLK' may be connected to upper erase control lines GIDLu_SS1 to GIDLu_SS3, middle erase control lines GIDLc_SSD1 to GIDLc_SSD3, and lower erase control lines GIDLd_SS1 to GIDLd_SS3. The memory block BLK' may include cell strings CS11 to CS33 each extending in a vertical direction VD.

FIG. 5 is a plan view illustrating a memory device 101 according to an embodiment.

Referring to FIG. 5, the memory device 101 may include first and second word line cut regions WLC1 and WLC2 apart from each other in a first horizontal direction HD1 and extending in a second horizontal direction HD2. Each of the memory blocks BLK1 to BLKz of FIG. 2 may be disposed in an area defined by two adjacent word line cut regions, for example, first and second word line cut regions WLC1 and WLC2. However, embodiments are not limited thereto, and each memory block may be disposed in an area defined by three or more adjacent word line cut regions.

One word line may be formed in an area defined by the first and second word line cut regions WLC1 and WLC2. An area defined by the first and second word line cut regions WLC1 and WLC2 may be referred to as a word line bar. However, embodiments are not limited thereto, and one word line may be formed in two or more areas defined by three or more adjacent word line cut regions. Accordingly, each memory block may include two or more word line bars.

The memory device 101 may include first to fifth string select line cut regions SSLC1 to SSLC5 between the first word line cut region WLC1 and the second word line cut region WLC2. The first to fifth string select line cut regions SSLC1 to SSLC5 may be spaced apart from each other in the first horizontal direction HD1 and may extend in the second horizontal direction HD2.

Accordingly, each memory block of the memory device 101 may have a 6SSL structure including six string select lines SSL1 to SSL6 defined by the first and second word line cut regions WLC1 and WLC2 and the first to fifth string select line cut regions SSLC1 to SSLC5. The first to sixth string select lines SSL1 to SSL6 may be divided into an outer string select line, a center string select line, and an inner string select line according to a distance from a word line cut region. For example, the first string select line SSL1 and the sixth string select line SSL6 may be positioned at a first distance d1 from the first word line cut region WLC1 or the second word line cut region WLC2, and thus may be classified as the outer string select line. The second string select line SSL2 and the fifth string select line SSL5 may be positioned at a second distance d2 from the first word line cut region WLC1 or the second word line cut region WLC2, and thus may be classified as the center string select line. The third string select line SSL3 and the fourth string select line SSL4 may be positioned at a third distance d3 from the first word line cut region WLC1 or the second word line cut region WLC2, and thus may be classified as the inner string select line. Although the six string select lines formed between the first word line cut region WLC1 and the second word line cut region WLC2 are described above as being divided into three types of string select lines, embodiments are not limited thereto. In embodiments, at least three string select lines may be formed between adjacent word line cut regions, and the string select lines may be divided into two or more types of string select lines according to a distance from the word line cut regions.

The memory device 101 may include a plurality of main channel holes MCH and a plurality of sub-channel holes SCH, which extend in the vertical direction VD. The main channel hole MCH and the sub-channel hole SCH may be connected to each other in the vertical direction VD. The main channel hole MCH and the sub-channel hole SCH form one cell string and may be apart from each other while forming a row and a column in a plan view. A plurality of memory cells may be formed in each main channel hole MCH. For example, the plurality of main channel holes MCH may be arranged in a honeycomb structure, but embodiments are not limited thereto. As such, a structure in which each memory block includes a plurality of main channel holes MCH may be referred to as a "multi-hole structure". The sub-channel holes SCH may be spaced apart from each other while forming rows and columns in a plan view. The sub-channel hole SCH may be disposed such that at least a portion thereof overlaps the main channel hole MCH in a plan view. In addition, each sub-channel hole SCH may be connected to a bit line extending in the first horizontal direction HD1. The plurality of sub-channel holes SCH may be connected to the first to sixth string select lines SSL1 to SSL6.

Among the plurality of main channel holes MCH, main channel holes overlapping the first to fifth string select line cut regions SSLC1 to SSLC5 in the vertical direction VD may be referred to as dummy holes. Referring to FIG. 5, the plurality of main channel holes MCH may be divided into inner channel holes, center channel holes, and outer channel holes according to a distance from an adjacent word line cut region. For example, main channel holes connected to the first and sixth string select lines SSL1 and SSL6, which may be the outer string select lines, may be classified as outer channel holes, main channel holes connected to the second and fifth string select lines SSL2 and SSL5, which may be the center string select lines, may be classified as center channel holes, and main channel holes connected to the third and fourth string select lines SSL3 and SSL4, which may be the inner string select lines, may be classified as inner channel holes.

An erase speed of memory cells formed in inner channel holes may be different from an erase speed of memory cells formed in outer channel holes. For example, the erase speed of memory cells formed in an inner channel hole may be slower than the erase speed of memory cells formed in an outer channel hole.

Figure 6:
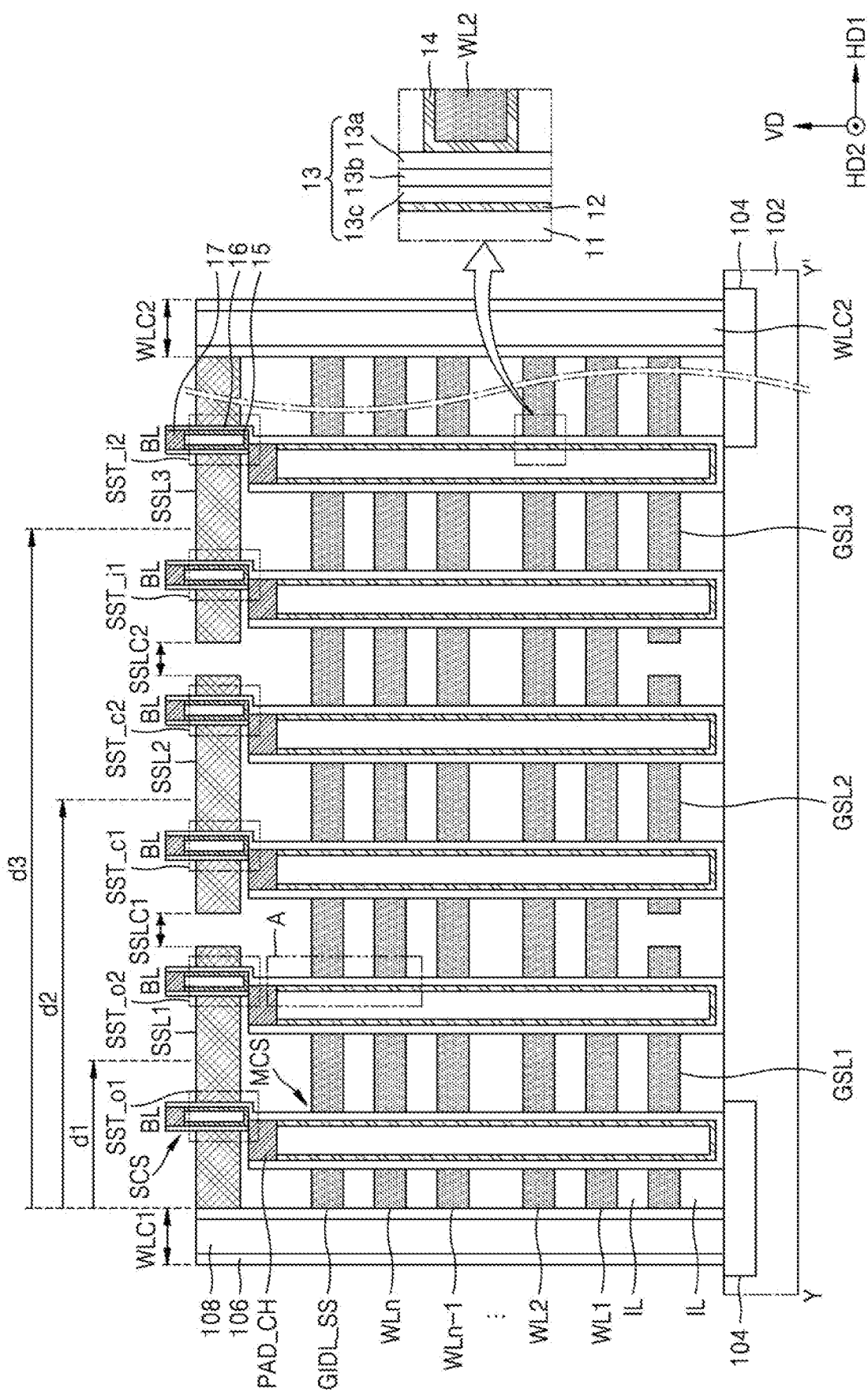
FIG. 6 is a cross-sectional view of the memory device taken along line Y1-Y1' of FIG. 5, according to an embodiment.

FIG. 6 is a cross-sectional view of the memory device 101 taken along line Y1-Y1' of FIG. 5, according to an embodiment.

Referring to both FIG. 5 and FIG. 6, a substrate 102 may have a main surface extending in the first horizontal direction HD1 and the second horizontal direction HD2. In an embodiment, the substrate 102 may include Si, Ge, or SiGe. In another embodiment, the substrate 102 may include a silicon-on-insulator (SOI) substrate or a germanium-on-insulator (GeOI) substrate. In the substrate 102, a common source region 104 may extend in the second horizontal direction HD2. The common source region 104 may function as a source region supplying current to memory cells. In an embodiment, the common source region 104 may be an impurity region heavily doped with n-type impurities. However, embodiments are not limited thereto, and in some embodiments, the common source region 104 may be a doped polysilicon region. Although FIG. 6 illustrates the common source region 104 as being formed in a region overlapping the first and second word line cut regions WLC1 and WLC2, embodiments are not limited thereto.

The first and second word line cut regions WLC1 and WLC2 may extend in the second horizontal direction HD2 parallel to the main surface of the substrate 102. The first and second word line cut regions WLC1 and WLC2 may define the width of each of the plurality of word lines WL1 to WLn in the first horizontal direction HD1. The plurality of word lines WL1 to WLn may be terminated by the first and second word line cut regions WLC1 and WLC2. For example, end portions of the plurality of word lines WL1 to WLn may contact the first and second word line cut regions WLC1 and WLC2.

An insulation spacer 106 and a common source line 108 may be formed inside each of the first and second word line cut regions WLC1 and WLC2. Each common source line 108 may extend in the second horizontal direction HD2 on a corresponding common source region 104. However, embodiments are not limited thereto, and in some embodiments, the first and second word line cut regions WLC1 and WLC2 may each include an insulating structure and thus may also be referred to as a word line cut structure. In some embodiments, the insulating structure may include silicon oxide, silicon nitride, silicon oxynitride, or a low-k material. For example, the insulating structure may include a silicon oxide layer, a silicon nitride layer, a SiON layer, a SiOCN layer, a SiCN layer, or a combination thereof. In other embodiments, at least a portion of the insulating structure may include an air gap. As used herein, the term "air" may refer to the atmosphere or other gases that may be present during the manufacturing process.

Between the first word line cut region WLC1 and the second word line cut region WLC2, ground select lines GSL1 to GSL3, a plurality of word lines WL1 to WLn, and an erase control line GIDL_SS may be sequentially stacked. The plurality of word lines WL1 to WLn may extend in the horizontal direction parallel to the main surface of the substrate 102, be apart from each other in a vertical direction VD perpendicular to the main surface of the substrate 102, and overlap each other. As such, the plurality of word lines WL1 to WLn may be stacked on the substrate 102 in the vertical direction VD. Although FIG. 6 illustrates that one erase control line GIDL_SS extends in the first horizontal direction HD1 between the first word line cut region WLC1 and the second word line cut region WLC2, embodiments are not limited thereto. As described above with reference to FIG. 3, the erasure control line GIDL_SS may be separated at a position overlapping the first and second string select line cut regions SSLC1 and SSLC2 such that separated erase control lines GIDL_SS1 to GIDL_SS3 correspond to the first to third string select lines SSL1 to SSL3, respectively.

The first to third string select lines SSL1, SSL2, and SSL3 may be disposed above the erase control line GIDL_SS. The first to third string select lines SSL1, SSL2, and SSL3 may be separated from each other and spaced apart from each other by the first and second string select line cut regions SSLC1 and SSLC2. For example, the first and second string select line cut regions SSLC1 and SSLC2 may be filled with an insulating layer. The insulating layer may include an oxide layer, a nitride layer, or a combination thereof. At least some of the first and second string select line cut regions SSLC1 and SSLC2 may be filled with an air gap.

The ground select lines GSL1 to GSL3, the plurality of word lines WL1 to WLn, the erase control line GIDL_SS, and the first to third string select lines SSL1, SSL2 and SSL3 may each include metal, metal silicide, a semiconductor doped with impurities, or a combination thereof. For example, the ground select lines GSL1 to GSL3, the plurality of word lines WL1 to WLn, the erase control line GIDL_SS, and the first to third string select lines SSL1, SSL2, and SSL3 may each include metal, such as tungsten, nickel, cobalt, or tantalum, metal silicide, such as tungsten silicide, nickel silicide, cobalt silicide, or tantalum silicide, polysilicon doped with impurities, or a combination thereof. An insulating layer may be arranged between the substrate 102 and the ground select lines GSL1, GSL2, and GSL3 and between each two of the ground select lines GSL1 to GSL3, the plurality of word lines WL1 to WLn, the erase control line GIDL_SS, and the first to third string select lines SSL1, SSL2, and SSL3. The insulating layer may include silicon oxide, silicon nitride, or silicon oxynitride.

A plurality of main channel structures MCS may pass through one of the ground select lines GSL1 to GSL3, the plurality of word lines WL1 to WLn, the erase control line GIDL_SS, and one of the first to third string select lines SSL1, SSL2, and SSL3 and extend in the vertical direction VD. The plurality of main channel structures MCS may respectively correspond to the plurality of main channel holes MCH of FIG. 5. The plurality of main channel structures MCS may be spaced apart from each other with a certain interval therebetween in the first horizontal direction HD1 and the second horizontal direction HD2.

Each of the main channel structures MCS may include a vertical channel layer 12, a buried insulating layer 11 filling a space inside the vertical channel layer 12, and a vertical insulating layer 13 disposed between the vertical channel layer 12 and gate lines (e.g., the erase control line GIDL_SS, the plurality of word lines WL1 to WLn, or the ground select lines GSL1 to GSL3). According to an embodiment, the main channel structure MCS may have an inclined side surface of which the diameter decreases toward the substrate 102. According to an embodiment, the main channel structure MCS may have an inclined side surface having a diameter which increases towards the substrate 102.

The vertical channel layer 12 may include a semiconductor material, such as polysilicon or monocrystalline silicon. For example, the semiconductor material may be a material not doped with impurities. According to an embodiment, the vertical channel layer 12 may have a column shape, such as a cylinder or a prism without the buried insulating layer 11. The vertical insulating layer 13 may include a blocking layer 13a, a charge storage layer 13b, and a tunnel insulating layer 13c.

The blocking layer 13a may be between the charge storage layer 13b and the gate lines. At least a portion of the blocking layer 13a may be formed to surround the gate lines and serve as the blocking layer 14. The blocking layer 13a may include a material having a larger energy band gap than the charge storage layer 13b. For example, the blocking layer 13a may be a silicon oxide layer, a silicon nitride layer, and/or a silicon oxynitride layer.

The charge storage layer 13b may be between the blocking layer 13a and the tunnel insulating layer 13c. For example, the charge storage layer 13b may include at least one of a silicon nitride layer, a silicon oxynitride layer, a silicon-rich nitride layer, a nanocrystalline silicon layer, and a laminated trap layer.

The tunnel insulating layer 13c may be between the charge storage layer 13b and the vertical channel layer 12. The tunnel insulating layer 13c may include a material having a larger band gap than the charge storage layer 13b. For example, the tunnel insulating layer 13c may be a silicon oxide layer.

A string select channel structure SCS may be formed on the main channel structure MCS. A portion of the string select channel structure SCS may overlap the main channel structure MCS. The string select channel structure SCS and the main channel structure MCS may form one cell string. A string select transistor may be formed in the string select channel structure SCS. For example, outer string select transistors SST_o1 and SST_o2 may be formed in a string select channel structure SCS connected to the first string select line SSL1, center string select transistors SST_c1 and SST_c2 may be formed in a string select channel structure SCS connected to the second string select line SSL2, and inner string select transistors SST_i1 and SST_i2 may be formed in a string select channel structure SCS connected to the third string select line SSL3.

The string select channel structure SCS and the main channel structure MCS may be electrically connected to each other through a channel pad PAD_CH. The string select channel structures SCS may include a string select channel layer 15, a string select insulating layer 16, and a string select channel pad 17.

The string select channel layer 15 may be formed in an annular shape surrounding an inner insulating layer but may also have a columnar shape, such as a cylinder or a prism, according to embodiments. The string select channel layer 15 may be connected to the main channel structure MCS at the bottom and may contact the channel pad PAD_CH. The string select channel layer 15 may include a semiconductor material, such as polycrystalline silicon or single crystal silicon, and the semiconductor material may be an undoped material or a material containing p-type or n-type impurities. For example, the string select channel layers 15 may include the same material as the vertical channel layer 12.

The string select insulating layer 16 may be formed to surround the string select channel layer 15. For example, the string select insulating layer 16 may include the same material as the vertical insulating layer 13.

According to an embodiment, the string select insulating layer 16 may include a charge storage layer. Threshold voltages of the string select transistors SST_o1, SST_o2, SST_c1, SST_c2, SST_i1, and SST_i2 may be adjusted by storing charge in the charge storage layer. The threshold voltages of the string select transistors SST_o1 and SST_o2 may be set to a first threshold voltage vth1, the threshold voltages of the string select transistors SST_c1 and SST_c2 may be set to a second threshold voltage vth2, and the threshold voltages of the string select transistors SST_i1 and SST_i2 may be set to a third threshold voltage vth3. In embodiments, the third threshold voltage vth3 may be greater than the second threshold voltage vth2, and the second threshold voltage vth2 may be greater than the first threshold voltage vth1.

The string select channel pad 17 may be formed in an upper end portion of the string select channel structure SCS and may be electrically connected to the bit line BL. For example, the string select channel pad 17 may include a conductive material. For example, the string select channel pad 17 may include doped polycrystalline silicon. The bit line BL may be disposed on the string select channel pad 17.

In a process of manufacturing the memory device 101, a plurality of insulating layers IL and a plurality of sacrificial insulating layers may be alternatingly stacked one by one on the substrate 102. For example, the plurality of insulating layers IL may include a silicon oxide layer, and the plurality of sacrificial insulating layers may include a silicon nitride layer. In this case, the plurality of sacrificial insulating layers may serve to secure a space for forming a plurality of gate lines including the ground select lines GSL1 to GSL3, the plurality of word lines WL1 to WLn, and the erase control line GIDL_SS in a subsequent process. Subsequently, a plurality of main channel structures MCS passing through the plurality of insulating layers IL and the plurality of sacrificial insulating layers may be formed. Subsequently, a plurality of sacrificial insulating layers may be replaced with a plurality of gate lines through word line cut holes respectively corresponding to the first and second word line cut regions WLC1 and WLC2. The word line cut holes may then be filled with an insulation spacer 106 and a common source line 108.

In this case, the thickness of each of the plurality of gate lines replacing from the plurality of sacrificial insulating layers in the vertical direction VD may vary depending on the distance from an adjacent word line cut region. For example, in a gate line disposed at a same level, a region relatively close to the first or second word line cut region WLC1 or WLC2 may be thicker in the vertical direction VD than a region relatively far from the first or second word line cut region WLC1 or WLC2. Accordingly, the thickness of a word line, connected to memory cells formed in inner channel holes, in the vertical direction VD, may be less than the thickness of a word line, connected to memory cells formed in outer channel holes, in the vertical direction VD. As a result, an erase speed of inner memory cells formed in the inner channel holes may be slower than an erase speed of outer memory cells formed in the outer channel holes.

Figure 7:
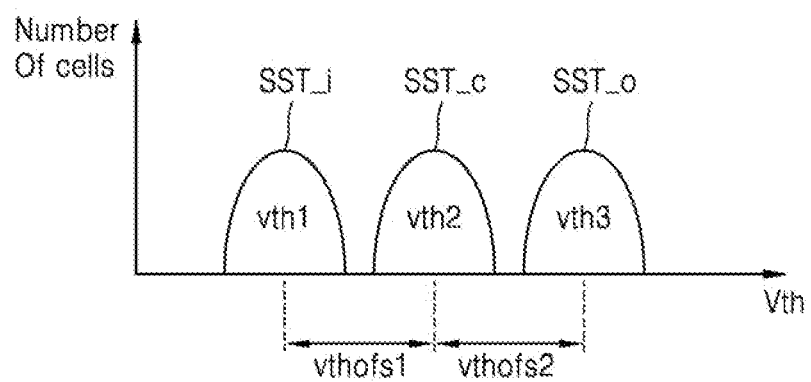
FIG. 7 is a view illustrating a threshold voltage of a string select transistor according to an embodiment.

FIG. 7 is a view illustrating a threshold voltage of a string select transistor according to an embodiment.

Referring to FIG. 7, an outer string select transistor SST_o may correspond to the outer string select transistors SST_o1 and SST_o2 of FIG. 6, a center string select transistor SST_c may correspond to the center string select transistors SST_c1 and SST_c2 of FIG. 6, and an inner string select transistor SST_i may correspond to the inner string select transistors SST_i1 and SST_i2 of FIG. 6.

The outer string select transistor SST_o may have a third threshold voltage vth3, the center string select transistor SST_c may have a second threshold voltage vth2, and the inner string select transistor SST_i may have a first threshold voltage vth1. The third threshold voltage vth3 may be greater than the second threshold voltage vth2, and the second threshold voltage vth2 may be greater than the first threshold voltage vth1. In embodiments, an outer string select transistor connected to the sixth string select line SSL6 of FIG. 5 may have the third threshold voltage vth3, a center string select transistor connected to the fifth string select line SSL5 of FIG. 5 may have the second threshold voltage vth2, and an inner string select transistor connected to the fourth string select line SSL4 of FIG. 5 may have the first threshold voltage vth1.

The level difference between the second threshold voltage vth2 and the first threshold voltage vth1 may be a first threshold voltage offset vthofs1, and the level difference between the third threshold voltage vth3 and the second threshold voltage vth2 may be a second threshold voltage offset vthofs2.

Figure 8:
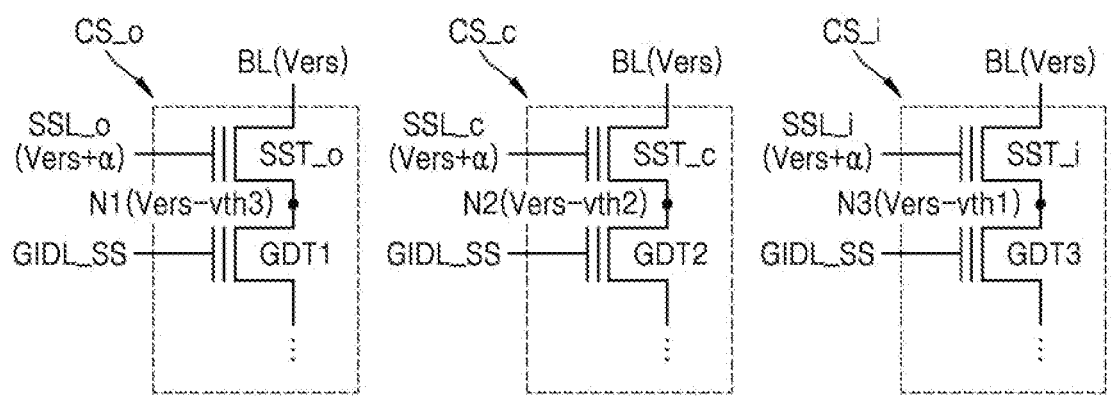
FIG. 8 is a view illustrating voltage conditions of each cell string during an erase operation according to an embodiment.

FIG. 8 is a view illustrating voltage conditions of each cell string during an erase operation according to an embodiment.

Referring to FIG. 8, an outer cell string CS_o may be a cell string connected to an outer string select line SSL_o, an center cell string CS_c may be a cell string connected to a center string select line SSL_c, and an inner cell string CS_i may be a cell string connected to an inner string select line SSL_i. The outer cell string CS_o may include an outer string select transistor SST_o and a first erase control transistor GDT1, and may be connected to the outer string select line SSL_o and an erase control line GIDL_SS. The center cell string CS_c may include a center string select transistor SST_c and a second erase control transistor GDT2 and may be connected to the center string select line SSL_c and the erase control line GIDL_SS. The inner cell string CS_i may include an inner string select transistor SST_i and a third erase control transistor GDT3 and may be connected to the inner string select line SSL_i and the erase control line GIDL_SS.

During an erase operation, an erase voltage Vers may be applied to a bit line BL, and a voltage having a level of 'Vers+α' may be applied to the string select lines SSL_o, SSL_c, and SSL_i. Here, 'α' may be equal to or greater than the threshold voltage vth3 of the outer string select transistor SST_o.

Voltages reduced by the threshold voltages vth1 to vth3 from the erase voltage Vers may be respectively applied to nodes N1 to N3 corresponding to the source terminals of the string select transistors SST_o, SST_c, and SST_i. For example, the voltage level of the node N3, which may be the source terminal of the outer string select transistor SST_o, may be 'Vers-vth3', the voltage level of the node N2, which may be the source terminal of the center string select transistor SST_c, may be 'Vers-vth2', and the voltage level of the node N1, which may be the source terminal of the inner string select transistor SST_i, may be 'Vers-vth1'.

The first to third erase control transistors GDT1 to GDT3 may generate a GIDL current based on the voltage levels of the nodes N1 to N3, and an erase operation may be performed on the memory cells of the cell strings CS_o, CS_c, and CS_i by the GIDL current.

According to an embodiment, the voltage levels of the nodes N1 to N3 may be set to be different from each other by setting the threshold voltages of the string select transistors SST_o, SST_c, and SST_i to be different, and because the levels of the GIDL currents flowing through the first to third erase control transistors GDT1 to GDT3 may be different, an erase speed deviation according to process characteristics of the cell strings CS_o, CS_c, and CS_i may be compensated for.

Figure 9:
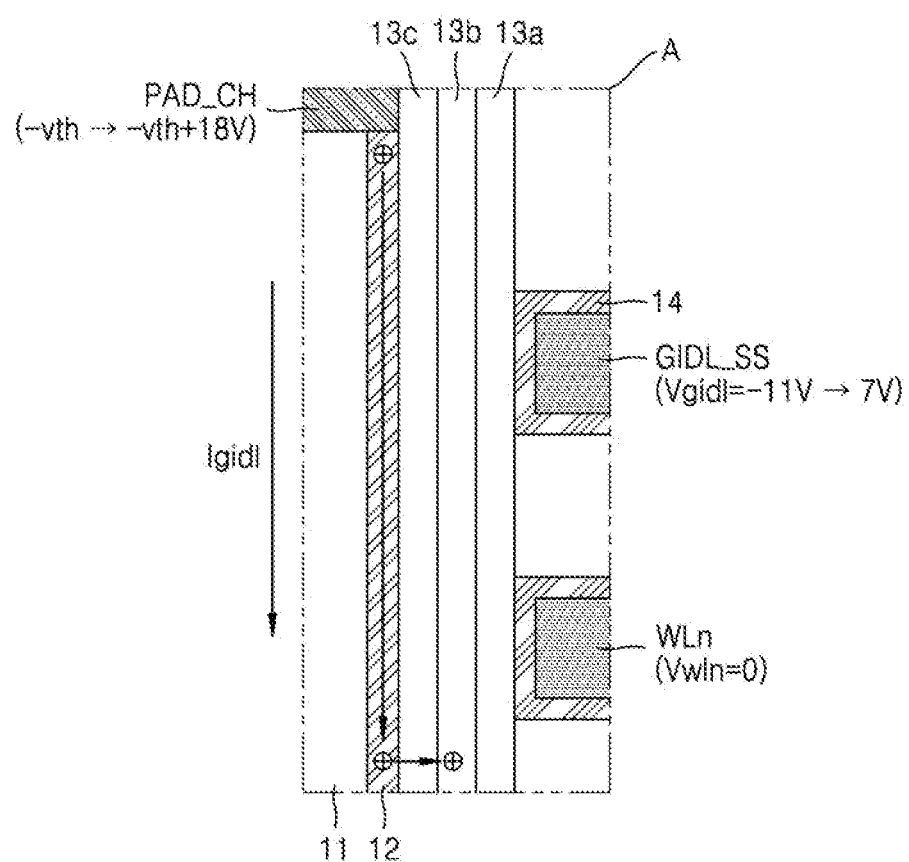
FIG. 9 is a cross-sectional view showing an enlarged area "A" of FIG. 6 according to an embodiment.

FIG. 9 is a cross-sectional view showing an enlarged area "A" of FIG. 6. For convenience of description, an example is provided below in which the erase voltage Vers is provided through the bit line BL during an erase operation.

Referring to FIG. 6, the erase voltage Vers may be applied to the bit line BL during an erase operation. In this case, the erase voltage Vers may drop by a threshold voltage of a string select transistor (e.g., SST_o1) corresponding to the string select channel structure SCS and be applied to a channel pad PAD_CH.

During the erase operation, an erase control voltage Vgidl may be applied to the erase control line GIDL_SS. For example, the target voltage level of the erase voltage Vers may be 18 volts (V). The erase control voltage Vgidl may be generated from the erase control line voltage V_ECL of FIG. 2. Also, the erase control voltage Vgidl may be applied while maintaining a constant potential difference from the erase voltage Vers. Also, during the erase operation, a word line voltage Vwln may be applied to an nth word line WLn. For example, the word line voltage Vwln may be 0V. The erase voltage Vers may step up until it reaches a target voltage level. A period in which the erase voltage Vers steps up to the target voltage level may be referred to as a setup period. During the setup period, the erase control voltage Vgidl may step up while maintaining a constant potential difference from the erase voltage Vers. For example, when the erase voltage Vers steps up from 0V to 18V, the erase control voltage Vgidl may step up from −11V to 7V. Therefore, during the erase operation, the erase control voltage Vgidl may maintain a constant potential difference (e.g., 11V-vth) from the voltage of the channel pad PAD_CH. For example, when a potential difference occurs between the drain terminal and the gate terminal of the erase control transistor GDT, an electron-hole pair may be generated due to a band-to-band tunneling effect. The electron-hole pair may cause the GIDL current Igidl. As a potential difference generated between the erase control line GIDL_SS and the channel pad PAD_CH increases, the absolute amount of holes (illustrated as "⊕") may increase.

During the setup period, the word line voltage Vwln may be applied to the word line WLn. The word line voltage Vwln may be, for example, 0V.

After the setup period, the erase voltage Vers may maintain the target voltage level. A period in which the erase voltage Vers maintains the target voltage level may be referred to as an execution period. During an execution period, an erase operation may be performed by moving holes of a vertical channel layer 12 adjacent to the word line WLn to a charge storage layer 13b adjacent to the word line WLn.

In embodiments, holes may move along the vertical channel layer 12 to a region adjacent to the word lines WL1 to WLn−1, and as holes move to the charge storage layer 13b adjacent to the word lines WL1 to WLn−1, an erase operation may be performed on the plurality of memory cells MCl to MCn.

According to an embodiment, because the threshold voltage of a string select transistor may be set to be different according to the distance from a word line cut region, a GIDL current flowing through a cell string may vary according to the distance from the word line cut region.

Figure 10A:
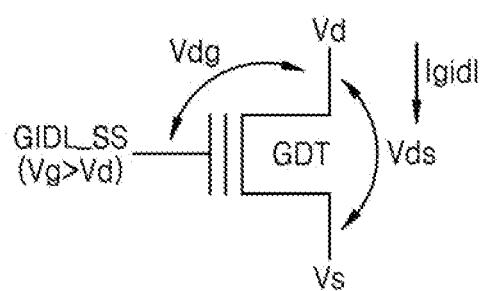
FIGS. 10A and 10B are views illustrating gate induced drain leakage (GIDL) current according to an embodiment.
Figure 10B:
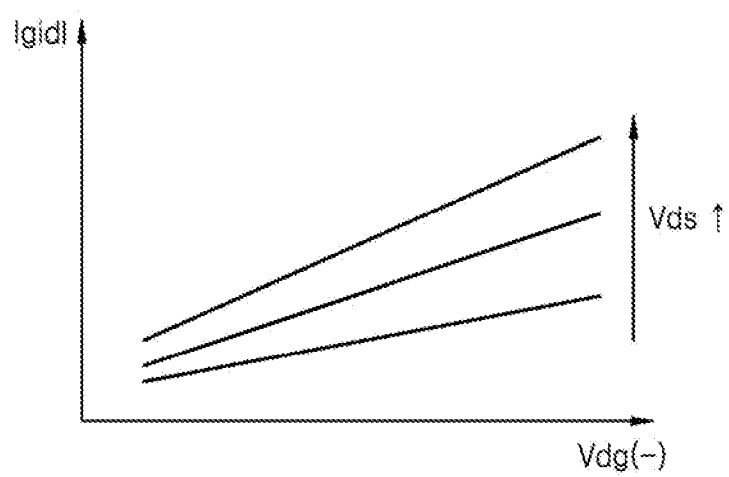

FIGS. 10A and 10B are views illustrating GIDL current according to an embodiment.

Referring to FIG. 10A, the gate terminal of an erase control transistor GDT may be connected to an erase control line GIDL_SS, and the voltage of the erase control line GIDL_SS may be Vg. The voltage of the drain terminal of the erase control transistor GDT may be Vd, and the voltage of the source terminal thereof may be Vs.

To generate the GIDL current Igidl, Vg may be greater than Vd. For example, the voltage difference Vdg between the drain terminal and the source terminal may be a negative value.

Referring to FIG. 10B, the level of the GIDL current Igidl may increase as the level of Vdg increases in a negative direction, for example, as the voltage Vg of the gate terminal increases. Therefore, the erase speed may be increased.

Furthermore, as the level of Vds increases, for example, as the voltage Vd of the drain terminal increases, the level of the GIDL current Igidl may increase. Therefore, the erase speed may be increased.

Referring to FIGS. 7 and 8, because the threshold voltage of the outer string select transistor SST_o may be relatively high, a relatively low level of Vd may be applied to the drain terminal of the first erase control transistor GDT1, for example, the node N1, and the erase speed may be relatively slow. In addition, because the threshold voltage of the inner string select transistor SST_i may be relatively low, a relatively high level of Vd may be applied to the drain terminal of the third erase control transistor GDT3, for example, the node N3, and the erase speed may be relatively fast.

For example, according to an embodiment, an erase speed deviation according to process characteristics may be compensated for by setting the threshold voltage of the string select transistor according to the distance from the word line cut region.

Figure 11:
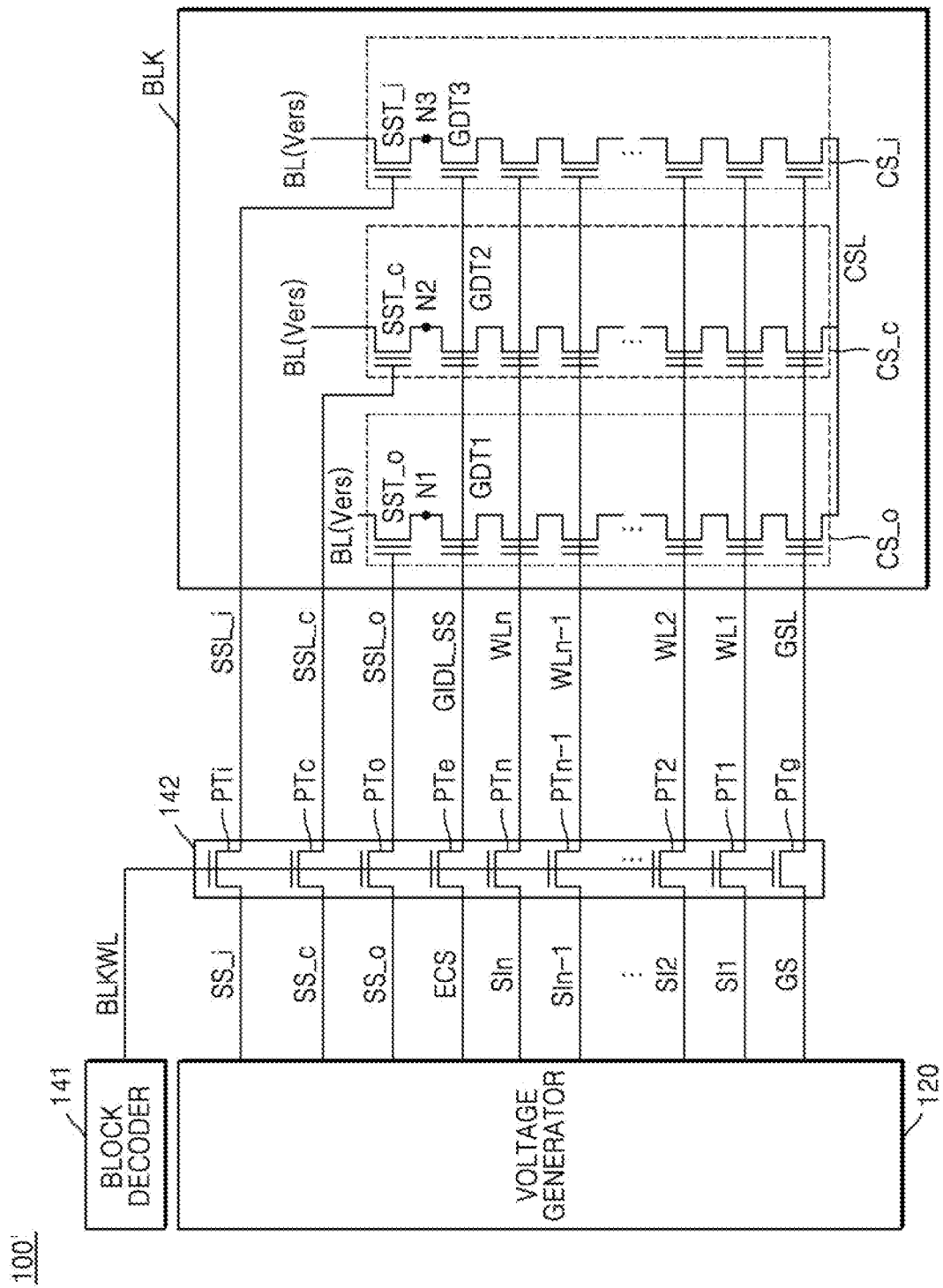
FIG. 11 is a view illustrating a memory device according to an embodiment.

FIG. 11 is a view illustrating a memory device 100' according to an embodiment.

Referring to FIG. 11, the memory device 100' may include a memory block BLK, a block decoder 141, a pass transistor circuit 142, and a voltage generator 120. The block decoder 141 and the pass transistor circuit 142 may be included in the row decoder 140 of FIG. 1.

The block decoder 141 may provide a block selection signal to the pass transistor circuit 142 through a block select line BLKWL. The block selection signal may be provided to gate terminals of a plurality of pass transistors PTo, PTc, PTi, PTe, PTl to PTn, and PTg included in the pass transistor circuit 142. For example, when the block selection signal is activated, the plurality of pass transistors PTo, PTc, PTi, PTe, PTl to PTn, and PTg in the pass transistor circuit 142 may be turned on, and thus the memory block BLK may be selected. Although FIG. 11 illustrates one block select line BLKWL as being commonly connected to the plurality of pass transistors PTo, PTc, PTi, PTe, PTl to PTn, and PTg, embodiments are not limited thereto. In some embodiments, at least two or more of the plurality of pass transistors PTo, PTc, PTi, PTe, PTl to PTn, and PTg may be respectively connected to two or more block select lines. In embodiments, the memory device 100' may include a plurality of memory blocks, and may perform an erase operation on a selected memory block BLK based on a block selection signal.

A voltage generator 120 may be connected to the pass transistor circuit 142 through string select line driving signal lines SS_o, SS_c, and SS_i, an erase control line driving signal line ECS, word line driving signal lines SI1 to SIn, and a ground select line driving signal line GS. For example, the string select line driving signal lines SS_o, SS_c and SS_i, the erase control line driving signal line ECS, the word line driving signal lines SI1 to SIn, and the ground select line driving signal line GS may be respectively connected to ends of the plurality of pass transistors PTo, PTc, PTi, PTe, PTl to PTn, and PTg in the pass transistor circuit 142.

The pass transistor circuit 142 may be connected to the memory block BLK through the string select lines SSL_o, SSL_c, and SSL_i, the erase control line GIDL_SS, the plurality of word lines WL1 to WLn, and the ground select line GSL.

When the block select signal is activated, the plurality of pass transistors PTo, PTc. PTi, PTe, PTl to PTn, and PTg may respectively provide driving signals to the string select lines SSL_o, SSL_c, and SSL_i, the erase control line GIDL_SS, the plurality of word lines WL1 to WLn, and the ground select line GSL, the driving signals being provided through the string select line driving signal lines SS_o, SS_c and SS_i, the erase control line driving signal line ECS, the word line driving signal lines SI1 to SIn, and the ground select line driving signal line GS.

The string select line SSL_o may be a string select line closest to a word line cut region, for example, an outer string select line, the string select line SSL_c may be a string select line second closest to the word line cut region, for example, a center string select line, and the string select line SSL_i may be a string select line farthest from the word line cut region, for example, an inner string select line.

The memory block BLK may include cell strings CS_o, CS_c, and CS_i. In addition, a string select transistor SST_o of the cell string CS_o may be connected to the string select line SSL_o, a string select transistor SST_c of the cell string CS_c may be connected to the string select line SSL_c, and a string select transistor SST_i of the cell string CS_i may be connected to the string select line SSL_i.

Figure 12:
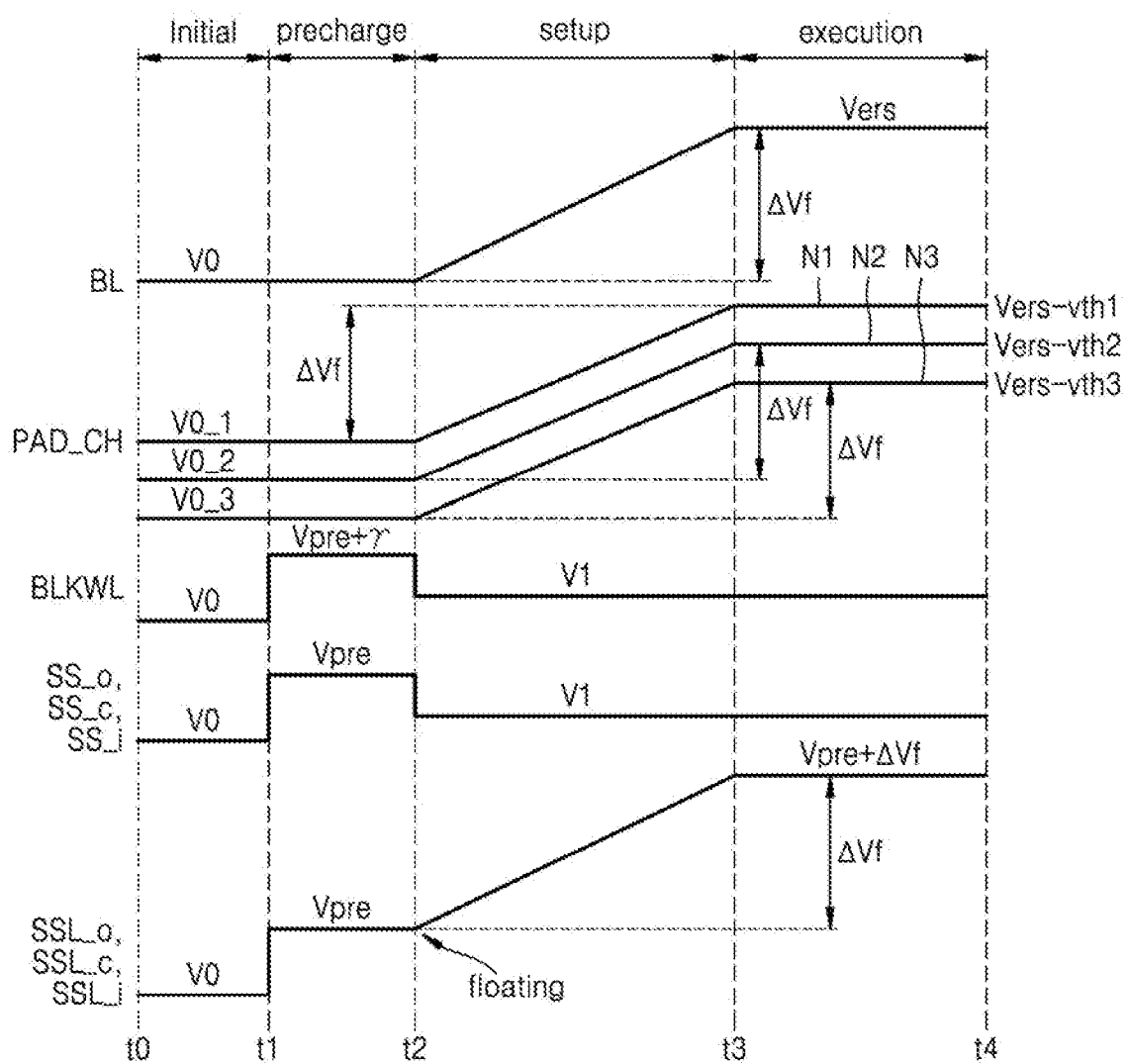
FIG. 12 is a timing diagram illustrating an erase operation according to an embodiment.

FIG. 12 is a timing diagram illustrating an erase operation according to an embodiment. For convenience of description, FIG. 12 is described below with reference to FIG. 11.

In a period from t0 to t1, an initialization operation may be performed.

For example, an initial voltage V0 may be applied to the bit line BL, the block select line BLKWL, the string select line driving signal lines SS_o, SS_c and SS_i, and the string select lines SSL_o, SSL_c, and SSL_i.

The initial voltage V0 may be, for example, a ground voltage GND. Accordingly, the bit line BL, the block select line BLKWL, the string select line driving signal lines SS_o, SS_c, and SS_i, and the string select lines SSL_o, SSL_c, and SSL_i may be discharged. However, embodiments are not limited thereto, and the initial voltage V0 may have various voltage levels such as a power supply voltage VDD in addition to the ground voltage GND. In addition, according to an embodiment, different voltage levels may be applied to the bit line BL, the block select line BLKWL, the string select line driving signal lines SS_o, SS_c and SS_i, and the string select lines SSL_o, SSL_c, and SSL_i. For example, the ground voltage GND may be applied to some of the bit line BL, the block select line BLKWL, the string select line driving signal lines SS_o, SS_c, and SS_i, and the string select lines SSL_o, SSL_c, and SSL_i, and the power supply voltage VDD may be applied to the other ones. Also, according to an embodiment, the initialization operation may be skipped, and the precharge operation described below may be immediately performed. Voltages of nodes N1 to N3 corresponding to the channel pad PAD_CH may be initial voltages V0_1 to V0_3. The initial voltages V0_1 to V0_3 may have levels obtained by subtracting the threshold voltages vth1, vth2, and vth3 of the string select transistors SST_o, SST_c, and SST_i from the initial voltage V0.

In a period t1 to t2, a precharge operation may be performed. For example, a precharge voltage Vpre generated by the voltage generator 120 may be transmitted to the string select line driving signal lines SS_o, SS_c, and SS_i. Because the voltage level of a block select line BLKWL may be higher than the precharge voltage Vpre (e.g., Vpre+γ), the pass transistors PTo, PTc, and PTi may be turned on, and accordingly, the voltage levels of the string select lines SSL_o, SSL_c, and SSL_i may also rise to the precharge voltage Vpre.

At time t2, the string select lines SSL_o, SSL_c, and SSL_i may be floated. For example, as the voltage level of the block select line BLKWL and the voltage levels of the string select line driving signal lines SS_o, SS_c, and SS_i all transition to the same level V1, the pass transistors PTo, PTc, and PTi may be turned off, and the string select lines SSL_o, SSL_c, and SSL_i may be floated.

In a period t2 to t3, a setup operation may be performed. For example, the erase voltage Vers provided through the bit line BL may increase. In some embodiments, the level of the erase voltage Vers may increase in stages, for example, may step up. In this case, the potential of a channel electrically connected to the bit line BL may also step up. In addition, the voltage levels of the string select lines SSL_o, SSL_c, and SSL_i electrically coupled to the channel may also step up. For example, an increase ΔVf of the erase voltage Vers may be equal to an increase ΔVf of the voltage levels of the string select lines SSL_o, SSL_c, and SSL_i.

Furthermore, the voltage levels of the nodes N1 to N3 may also step up, and an increase ΔVf of the voltage levels of the nodes N1 to N3 may be equal to an increase ΔVf of the voltage levels of the string select lines SSL_o, SSL_c, and SSL_i.

In this case, the voltage levels of the string select lines SSL_o, SSL_c, and SSL_i may step up while maintaining a potential difference which is the same as the precharge voltage Vpre from the voltage level of the erase voltage Vers.

At time t3, the voltage level of the node N1 may be a voltage level corresponding to the difference between the erase voltage Vers and the threshold voltage Vth1, the voltage level of the node N2 may be a voltage level corresponding to the difference between the erase voltage Vers and the threshold voltage Vth2, and the voltage level of the node N3 may be a voltage level corresponding to the difference between the erase voltage Vers and the threshold voltage Vth3.

In a period t3 to t4, an execution operation may be performed. For example, a voltage level of the string select lines SSL_o, SSL_c, and SSL_i (e.g., Vpre+ΔVf) may be maintained, and a voltage level of the erase voltage Vers provided through the bit line BL (e.g., V0+ΔVf) may be maintained. A voltage level of the node N1 (e.g., V0+ΔVf-vth1), a voltage level of the node N2 (e.g., V0+ΔVf-vth2), and a voltage level of the node N3 (e.g., V0+ΔVf-vth3) may also be maintained. For example, because the voltage level is high in the order of the nodes N1 to N3 and a constant voltage is applied to the erase control line GIDL_SS, the GIDL current flowing by the erase control transistors GDT1, GDT2, and GDT3 may be high in the order of the cell strings CS_i, CS_c, and CS_o. For example, as different GIDL currents flow through the cell strings CS_i, CS_c, and CS_o, an erase speed deviation between the cell strings CS_i, CS_c, and CS_o due to process characteristics may be compensated for.

Figure 13:
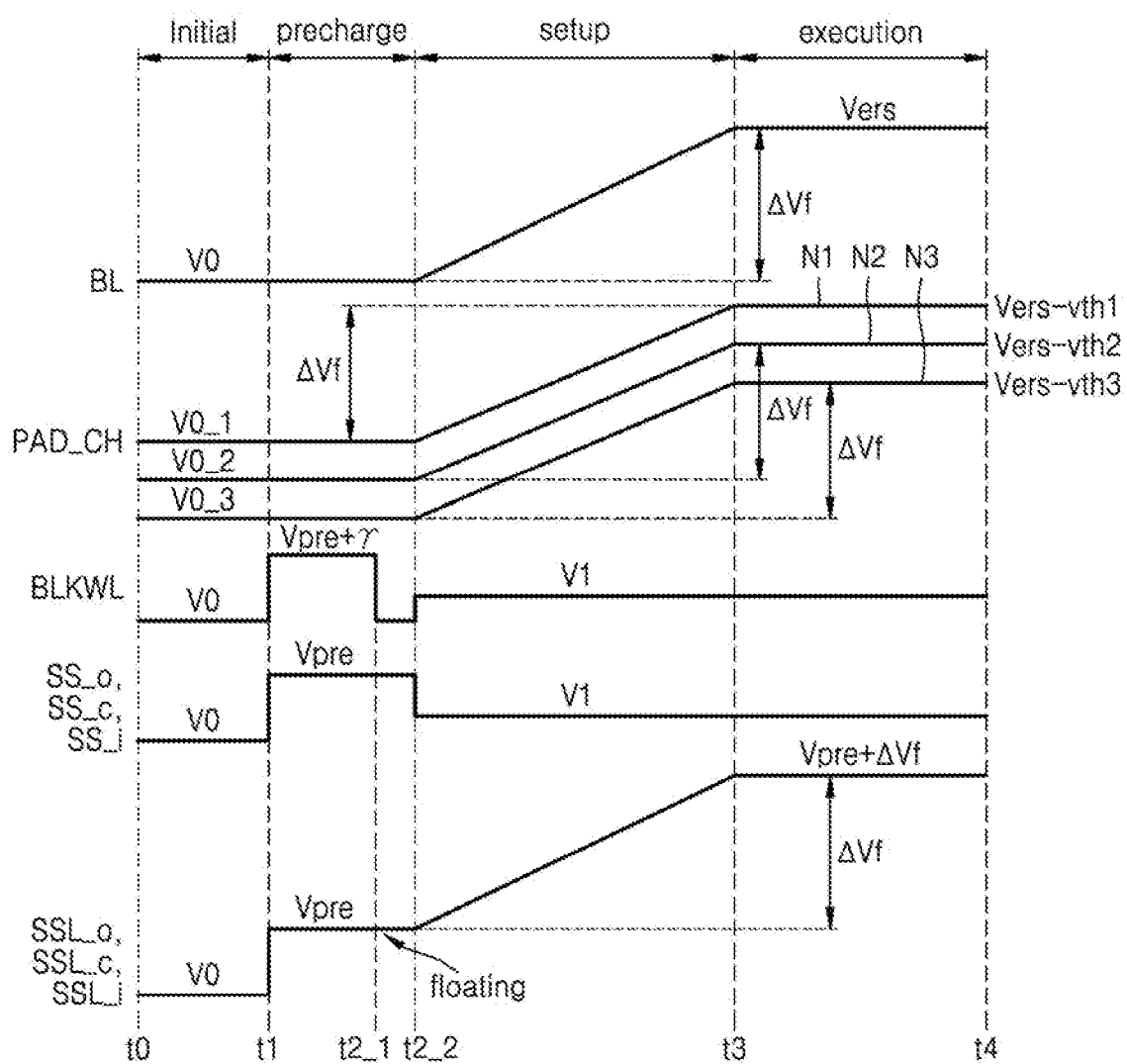
FIG. 13 is a view illustrating an example of an operation of a memory device according to an embodiment, the memory device being capable of preventing leakage current in a precharge period.

FIG. 13 is a timing diagram illustrating an example of an operation of a memory device according to an embodiment, the memory device being capable of preventing leakage current in a precharge period.

FIG. 13 is described below with reference to FIGS. 11 and 12, and the same or similar components are denoted using the same or similar reference numerals, and repeated, redundant, or duplicative descriptions are omitted below.

Referring to FIG. 13, a precharge operation may be performed in a period from t1 to t2_2. In this case, the voltage level of the block select line BLKWL may transition to a low level before the voltage level of the string select line driving signal lines SS_o, SS_c, and SS_i, and thus, a voltage drop of the string select lines SSL_o, SSL_c, and SSL_i due to leakage current in the precharge period may be prevented.

For example, in a period from t1 to t2_1, the voltage level of the block select line BLKWL may transition to a voltage level higher than the precharge voltage Vpre (e.g., Vpre+γ), and accordingly, the pass transistors PTo, PTc, and PTi may be turned on. Therefore, the precharge voltage Vpre of the string select line driving signal lines SS_o, SS_c, and SS_i may be transferred to the string select lines SSL_o, SSL_c, and SSL_i, and the voltage level of the string select lines SSL_o, SSL_c, and SSL_i may rise to the precharge voltage Vpre.

Thereafter, at a time point t2_1, the voltage level of the block select line BLKWL may transition to the initial voltage V0. In this case, the voltage level of the string select line driving signal lines SS_o, SS_c, and SS_i may continuously maintain the precharge voltage Vpre by the voltage generator 120. For example, the voltage level of the string select line driving signal lines SS_o, SS_c, and SS_i may maintain the precharge voltage Vpre until the pass transistors PTo, PTc, and PTi are completely turned off. Then, at a time point t2_2, the voltage level of the block select line BLKWL and the voltage level of the string select line driving signal lines SS_o, SS_c, and SS_i may both transition to the same voltage level V1.

When the voltage level of the string select line driving signal lines SS_o, SS_c, and SS_i is lowered to a first voltage level V1 before the pass transistors PTo, PTc, and PTi are turned off, leakage current may occur from the string select lines SSL_o, SSL_c, and SSL_i toward the string select line driving signal lines SS_o, SS_c, and SS_i. For this reason, the string select lines SSL_o, SSL_c, and SSL_i may be precharged to a level lower than the precharge voltage Vpre in the precharge period. Finally, because the voltage level of the string select lines SSL_o, SSL_c, and SSL_i is lowered in an execution period, the erase speed may be slowed down (an example of which is described above with reference to FIG. 10B).

Figure 14:
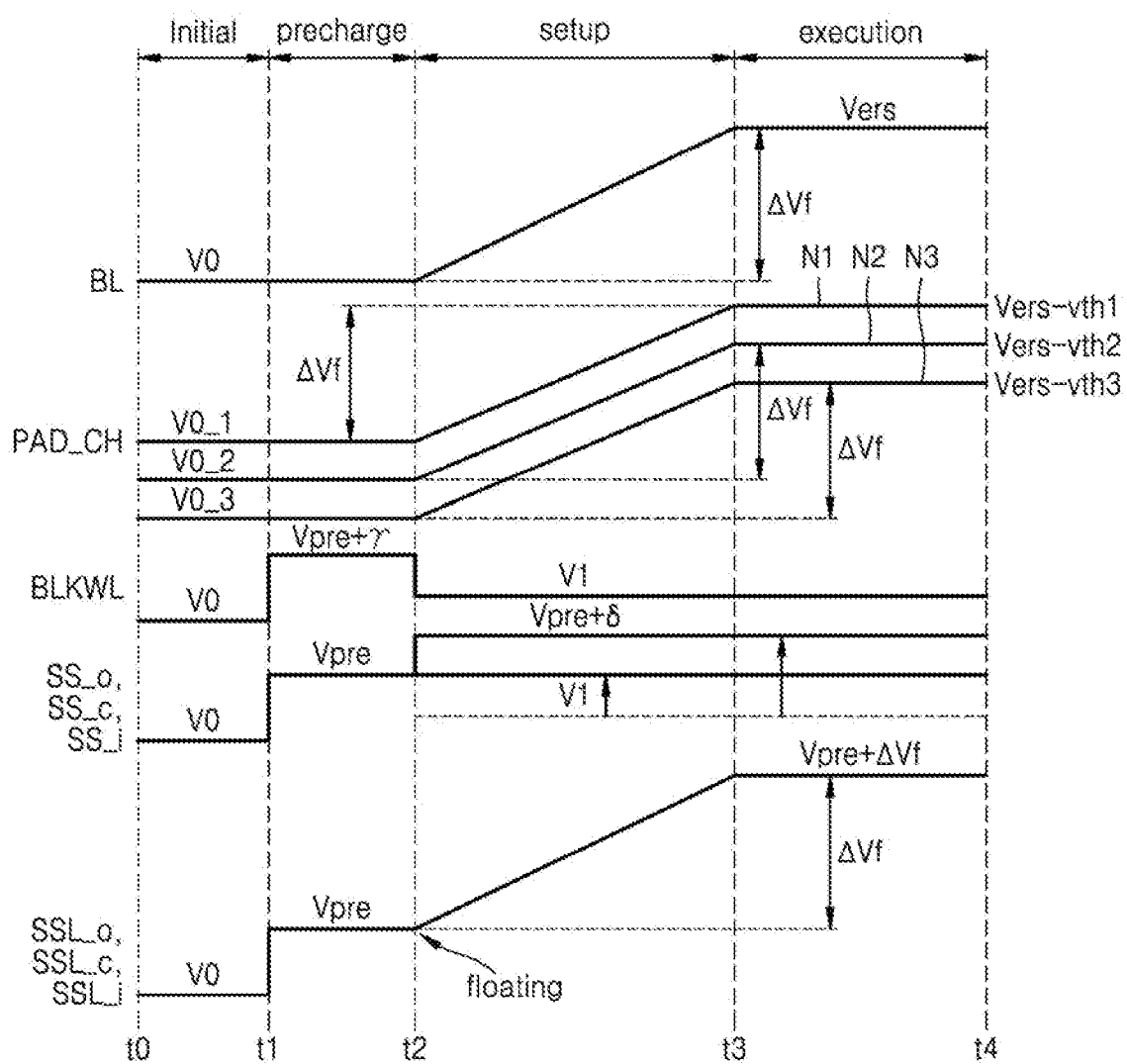
FIG. 14 is a view illustrating an example of an operation of a memory device according to an embodiment, the memory device being capable of preventing leakage current in a setup period and an execution period.

FIG. 14 is a view illustrating an example of an operation of a memory device according to an embodiment, the memory device being capable of preventing leakage current in a setup period and an execution period.

The configuration and operation of the memory device in FIG. 14 may be similar to those in FIGS. 11 and 12. Therefore, the same or similar components may be denoted using the same or similar reference numerals, and repeated, redundant, or duplicative descriptions may be omitted below.

Referring to FIG. 14, in a period from t2 to t4, a setup operation and an execution operation may be performed. In this case, the voltage level of the string select line driving signal lines SS_o, SS_c, and SS_i may be set to a higher level than that of the block select line BLKWL. For example, as shown in FIG. 14, the voltage level of the string select line driving signal lines SS_o, SS_c, and SS_i may be the precharge voltage Vpre, or a voltage higher than the precharge voltage Vpre (e.g., Vpre+8).

When the voltage level of the string select line driving signal lines SS_o, SS_c, and SS_i is the first voltage level V1, as the voltage levels of the string select lines SSL_o, SSL_c, and SSL_i step up, the voltage difference between the string select lines SSL_o, SSL_c, and SSL_i and the string select line driving signal lines SS_o, SS_c, and SS_i may gradually increase. This may cause leakage current from the string select lines SSL_o, SSL_c, and SSL_i toward the string select line driving signal lines SS_o, SS_c, and SS_i. As a result, voltages of the string select lines SSL_o, SSL_c, and SSL_i may be lowered and an erase speed may be slowed down.

In order to prevent such a leakage current, the voltage level of the string select line driving signal lines SS_o, SS_c, and SS_i may be set higher than that of the block select line BLKWL. In this case, because the voltage level of the string select line driving signal lines SS_o, SS_c, and SS_i may be higher than that of the block select line BLKWL, leakage current flowing through the pass transistors PTs1 to PTs3 may be reduced and a normal erase speed may be maintained.

Figure 15:
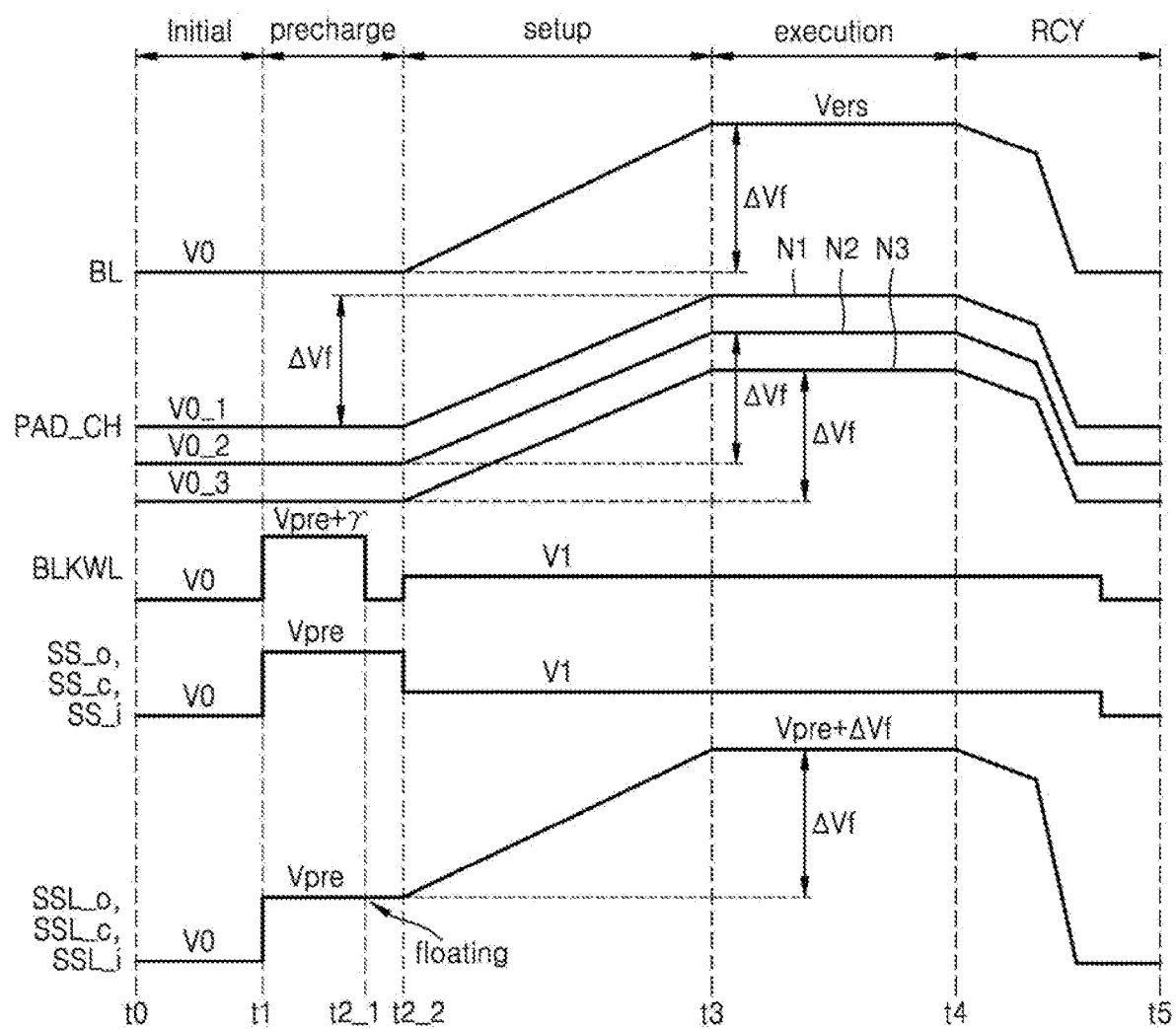
FIG. 15 is a view illustrating an example of an operation of a memory device according to an embodiment, the memory device being capable of preventing leakage current in a recovery period.

FIG. 15 is a view illustrating an example of an operation of a memory device according to an embodiment, the memory device being capable of preventing leakage current in a recovery period.

The configuration and operation of the memory device in FIG. 15 may be similar to those in FIGS. 11 and 13. Therefore, the same or similar components may be denoted using the same or similar reference numerals, and repeated, redundant, or duplicative descriptions may be omitted below.

Referring to FIG. 15, a recovery operation may be performed in a period from t4 to t5. During a recovery operation, the voltages of the bit line BL, the block select line BLKWL, the string select line driving signal lines SS_o, SS_c, and SS_i, and the string select lines SSL_o, SSL_c, and SSL_i may transition to an initial voltage V0. In this case, the voltage level of the string select line driving signal lines SS_o, SS_c, and SS_i may be higher than the voltage level of the block select line BLKWL until the voltage level of the block select line BLKWL transitions to the initial voltage V0. Accordingly, leakage current in the recovery period may be prevented.

For example, when the voltage level of the string select line driving signal lines SS_o, SS_c, and SS_i transitions to the initial voltage V0 before the block select line BLKWL transitions in the recovery period, the pass transistors PTo, PTc, and PTi may be slightly turned on, and leakage current may occur from the string select lines SSL_o, SSL_c, and SSL_i toward the string select line driving signal lines SS_o, SS_c, and SS_i. In order to prevent such a leakage current, the voltage level of the string select line driving signal lines SS_o, SS_c, and SS_i may be maintained high until the voltage level of the block select line BLKWL transitions to the initial voltage V0. Therefore, the recovery operation may be stably performed.

Figure 16:
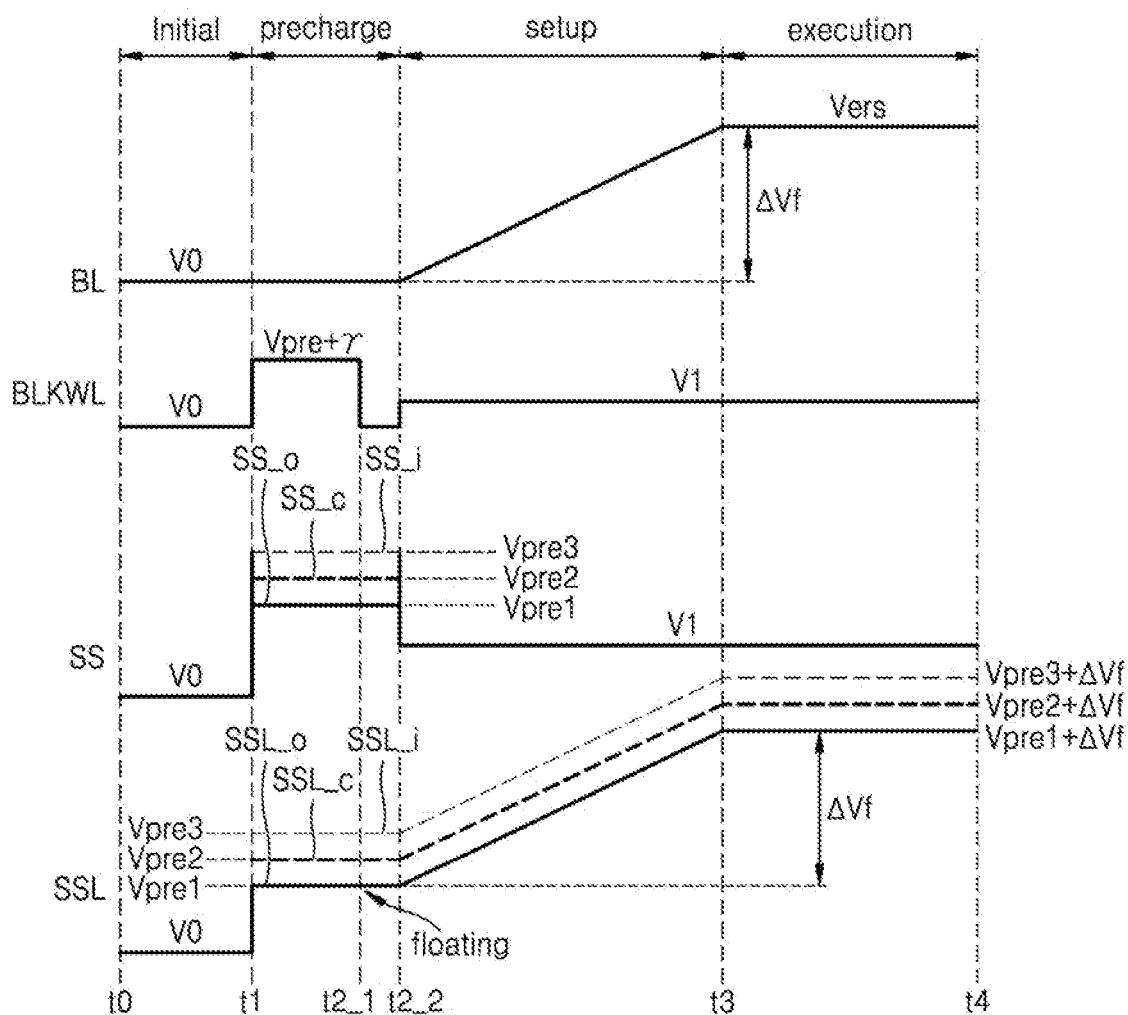
FIG. 16 is a timing diagram illustrating an erase operation of adjusting a precharge voltage for each string select line according to an embodiment.

FIG. 16 is a timing diagram illustrating an erase operation of adjusting a precharge voltage for each string select line according to an embodiment.

Referring to FIG. 16, during a precharge period, precharge voltages of different levels may be applied to the string select line driving signal lines SS_o, SS_c, and SS_i. For example, a precharge voltage Vpre1 may be applied to the string select line driving signal line SS_o, a precharge voltage Vpre2 may be applied to the string select line driving signal line SS_c, and a precharge voltage Vpre3 may be applied to the string select line driving signal line SS_i. Vpre2 may be greater than Vpre1, and Vpre3 may be greater than Vpre2.

In embodiments, as described above with reference to FIGS. 7, 8, and 12, the threshold voltages of the string select transistors SST_o, SST_c, and SST_i may be set to be different, and the nodes N1 to N3 may be precharged to different levels. In some embodiments, the threshold voltages of the string select transistors SST_o, SST_c, and SST_i may be set to be the same, and the nodes N1 to N3 may be precharged to the same level.

During a precharge period, because the voltages of the string select line driving signal lines SS_o, SS_c, and SS_i may be transferred to the string select lines SSL_o, SSL_c, and SSL_i, the string select lines SSL_o, SSL_c, and SSL_i may be also pre-charged at different levels. For example, the voltage of the string select line SSL_o may be a precharge voltage Vpre1, the voltage of the string select line SSL_c may be a precharge voltage Vpre2, and the voltage of the string select line SSL_i may be a precharge voltage Vpre3.

During a setup period, each of the string select lines SSL_o, SSL_c, and SSL_i may be precharged while maintaining a constant level difference from the erase voltage Vers of the bit line BL.

During an execution period, the voltage of the string select line SSL_o may be maintained at Vpre1+ΔVf, the voltage of the string select line SSL_c may be maintained at Vpre2+ΔVf, and the voltage of the string select line SSL_i may be maintained at Vpre3+ΔVf.

Figure 17:
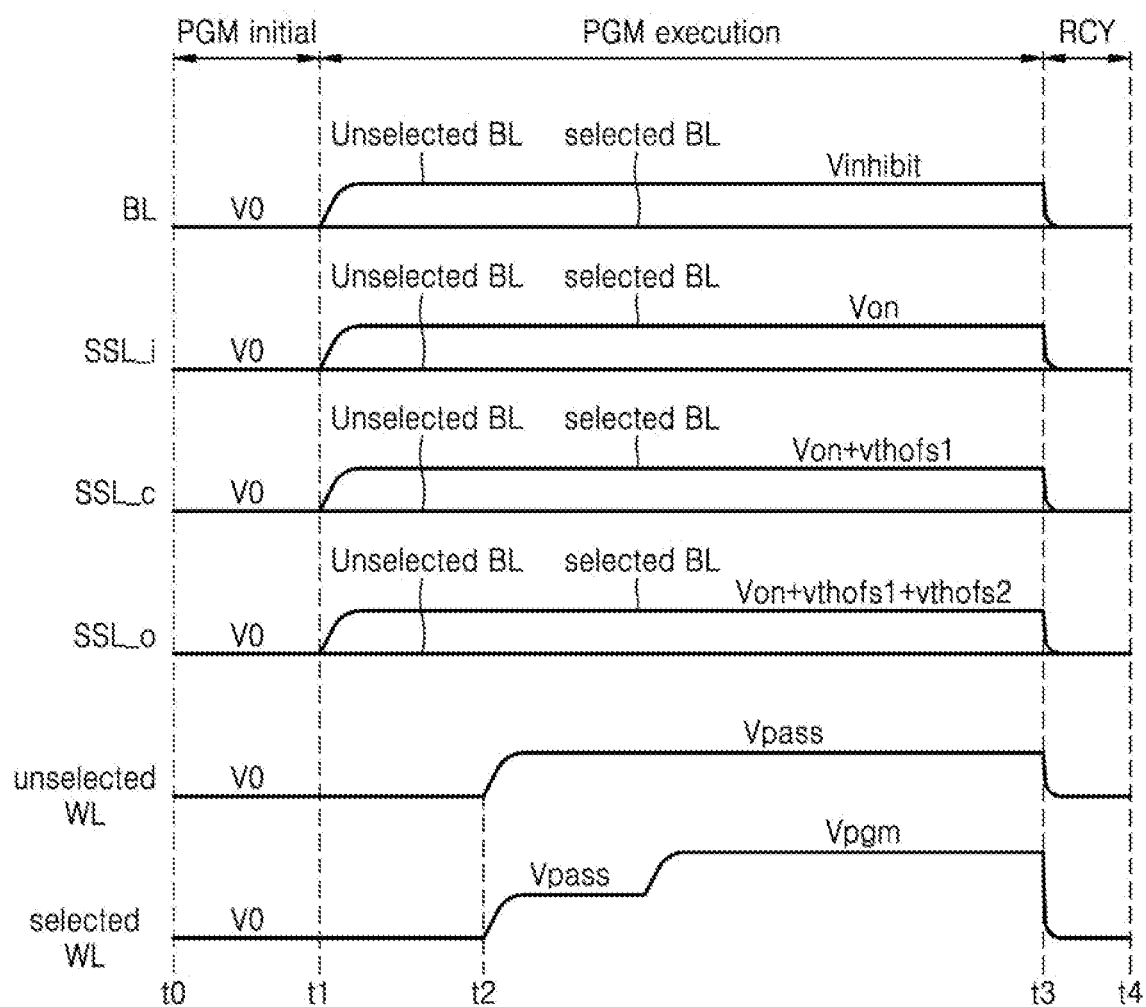
FIG. 17 is a timing diagram illustrating a voltage applied to a string select line during a program operation according to an embodiment.

FIG. 17 is a timing diagram illustrating a voltage applied to a string select line during a program operation according to an embodiment.

Referring to FIG. 17, a program initialization operation may be performed between time t0 and time t1. During the program initialization operation, voltages of selected bit lines, unselected bit lines, the string select lines SSL_o, SSL_c, and SSL_i, unselected word lines, and selected word lines may be initialized to the initial voltage V0.

Between time t1 and time t3, a program execution operation may be performed. For example, at time t1, an inhibit voltage Vinhibit may be applied to the unselected bit lines. The voltage level of the inhibit voltage Vinhibit may be higher than that of the initial voltage V0. A voltage applied to the selected bit lines may be maintained as the initial voltage V0. The initial voltage V0 may be a ground voltage.

At time t1, the voltage level of a selected string select line among the string select lines SSL_o, SSL_c, and SSL_i may increase. As a string select transistor connected to the selected string select line is turned on, the initial voltage V0 may be provided to the channel of a selected cell string. In FIG. 17, the number of selected string select lines among the string select lines SSL_o, SSL_c, and SSL_i may be one, two, or three.

At time t1, the voltage of an unselected string select line among the string select lines SSL_o, SSL_c, and SSL_i may be maintained at the initial voltage V0. A string select transistor of an unselected cell string may be turned off by the initial voltage V0 and the channel of the unselected cell string may be floated. In some embodiments, the voltage of the unselected string select line may rise without being maintained at the initial voltage V0. In some embodiments, the channel of the unselected cell string may be floated by the increased voltage of the unselected string select line and the inhibit voltage Vinhibit of the unselected bit line.

When the string select line SSL_i is the selected string select line, a turn-on voltage Von may be applied to the string select line SSL_i at time t1. Referring to FIG. 7, because the threshold voltage of the string select transistor SST_i may be vth1 and the turn-on voltage Von may be applied to the string select line SSL_i, the string select transistor SST_i may be turned on.

Referring to FIG. 7, the threshold voltage vth2 of the string select transistor SST_c may be greater than the first threshold voltage vth1 of the string select transistor SST_i by a first threshold voltage offset vthofs1. Accordingly, when the string select line SSL_c is the selected string select line, a voltage obtained by adding the first threshold voltage offset vthofs1 to the turn-on voltage Von may be applied to the string select line SSL_c, and thus, the string select transistor SST_c may be turned on.

Referring to FIG. 7, the third threshold voltage vth3 of the string select transistor SST_o may be greater than the second threshold voltage vth2 of the string select transistor SST_c by a second threshold voltage offset vthofs2. The second threshold voltage offset vthofs2 may be the same as, or different from, the first threshold voltage offset vthofs1. Therefore, when the string select line SSL_o is the selected string select line, a voltage obtained by adding the first threshold voltage offset vthofs1 and the second threshold voltage offset vthofs2 to the turn-on voltage Von may be applied to the string select line SSL_o, thereby turning on the string select transistor SST_o.

Between the time t2 and the time t3, a pass voltage Vpass may be applied to unselected word lines. The pass voltage Vpass may be a voltage for turning on a plurality of memory cells. The pass voltage Vpass and a program voltage Vpgm may be sequentially applied to selected word lines.

Between time T3 and time t4, a recovery operation may be performed. During the recovery operation, the voltages of the bit lines, the string select lines SSL_o, SSL_c, and SSL_i, and the word lines may be initialized to the initial voltage V0.

Figure 18:
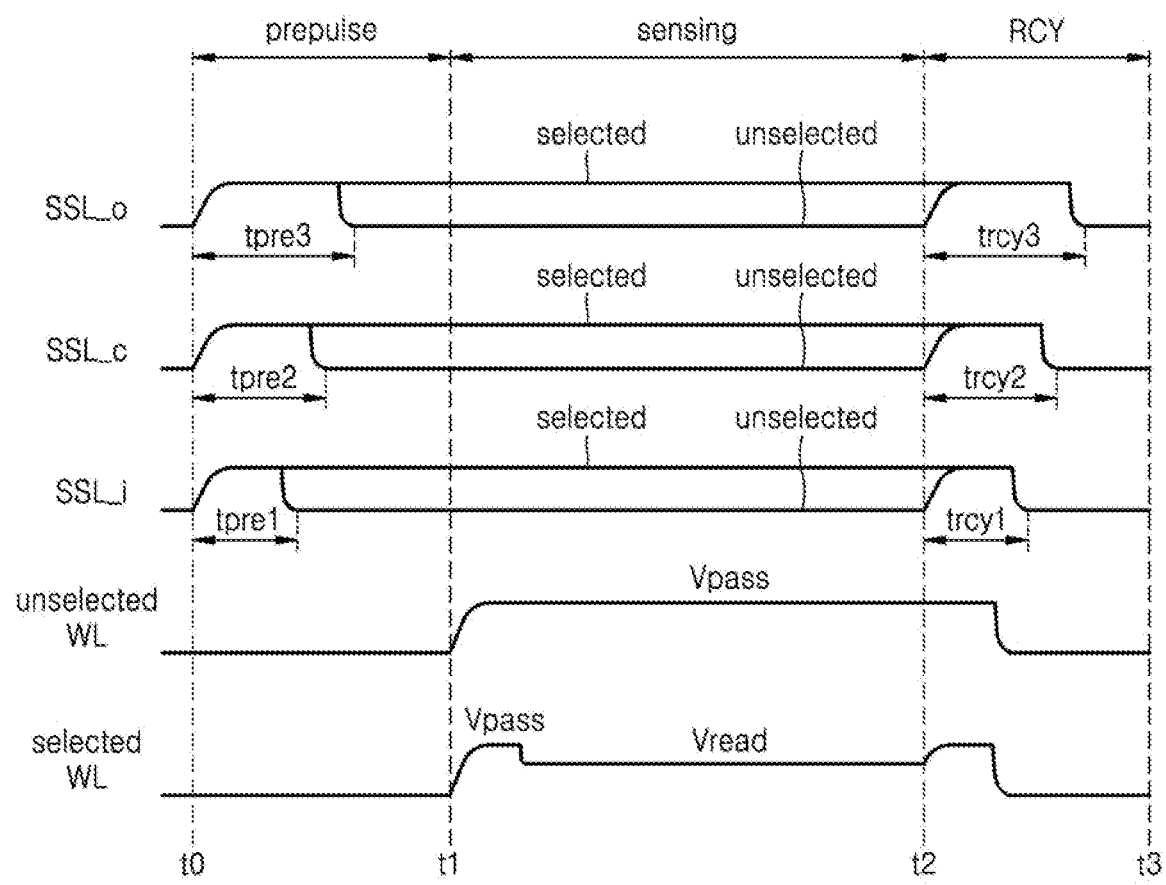
FIG. 18 is a timing diagram illustrating a voltage applied to a string select line during a read operation according to an embodiment.

FIG. 18 is a timing diagram illustrating a voltage applied to a string select line during a read operation according to an embodiment.

Referring to FIG. 18, a pre-pulse operation may be performed between a time t0 and a time t1. During the pre-pulse operation, a pulse voltage may be applied to an unselected string select line among the string select lines SSL_o, SSL_c, and SSL_i during a pre-pulse time period. For example, when the string select line SSL_i is an unselected string select line, a pulse voltage may be applied during a pre-pulse period tpre1. When the string select line SSL_c is an unselected string select line, a pulse voltage may be applied during a pre-pulse period tpre2. The length of the pre-pulse period tpre2 may be greater than the length of the pre-pulse period tpre1. When the string select line SSL_o is an unselected string select line, a pulse voltage may be applied during a pre-pulse period tpre3. The length of the pre-pulse period tpre3 may be greater than the length of the pre-pulse period tpre2. For example, because a string select transistor having a high threshold voltage may be turned on relatively weakly, a deviation due to a difference in threshold voltage may be compensated by extending a time for which a pulse voltage is applied. In some embodiments, the level of a pulse voltage applied to the string select line SSL_i may be Vpre, the level of a pulse voltage applied to the string select line SSL_c may be Vpre+vthofs1, and the level of a pulse voltage applied to the string select line SSL_o may be Vpre+vthofs+vthofs2. A voltage level of a selected string select line may be maintained at a pulse voltage level during a sensing period.

Between time t1 and time t2, a sensing operation may be performed. For example, the pass voltage Vpass may be applied to the word lines at time t1. The pass voltage Vpass may have a voltage level at which all memory cells are turned on. The voltage level of a selected word line may transition from the pass voltage Vpass to a read voltage Vread. The read voltage Vread may have a voltage level for sensing a target program state.

Between time t2 and time t3, a recovery operation may be performed. During the recovery operation, voltages of the string select lines SSL_o, SSL_c, and SSL_i and the word lines may be initialized to initial voltages. A pulse voltage may be applied to an unselected string select line during a recovery time period. For example, when the string select line SSL_i is an unselected string select line, a pulse voltage may be applied during a recovery period trcy1. When the string select line SSL_c is an unselected string select line, a pulse voltage may be applied during a recovery period trcy2. The length of the recovery period trcy2 may be greater than that of the recovery period trcy1. When the string select line SSL_o is an unselected string select line, a pulse voltage may be applied during a recovery period trcy3. The length of the recovery period trcy3 may be greater than that of the recovery period trcy2. For example, because a string select transistor having a high threshold voltage may be turned on relatively weakly, a deviation due to a difference in threshold voltage may be compensated by extending a time for which a pulse voltage is applied. In some embodiments, the level of a pulse voltage applied to the string select line SSL_i may be Vpre, the level of a pulse voltage applied to the string select line SSL_c may be Vpre+vthofs1, and the level of a pulse voltage applied to the string select line SSL_o may be Vpre+vthofs+vthofs2.

Figure 19:
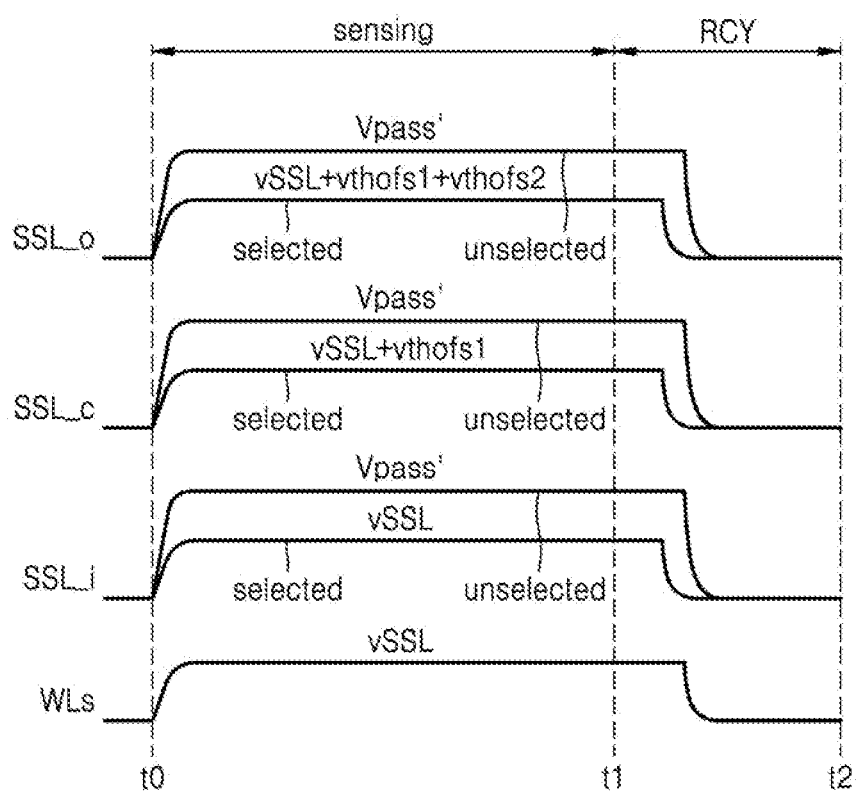
FIG. 19 is a timing diagram illustrating a threshold voltage checking operation for checking a threshold voltage of a string select transistor according to an embodiment.

FIG. 19 is a timing diagram illustrating a threshold voltage checking operation for checking a threshold voltage of a string select transistor according to an embodiment.

Referring to FIG. 19, a sensing operation may be performed between time to and time t1. During the sensing operation, a pass voltage Vpass' may be applied to an unselected string select line among the string select lines SSL_o, SSL_c, and SSL_i, and a check voltage may be applied to a selected string select line. The pass voltage Vpass' may be greater than threshold voltages of the string select transistors SST_o, SST_c, and SST_i. For example, when the string select line SSL_i is a selected string select line, the voltage level of the check voltage may be vSSL. The voltage level vSSL may be a voltage level for detecting a threshold voltage distribution of the string select transistor SST_i. When the string select line SSL_c is a selected string select line, the voltage level of the check voltage may be vSSL+vthofs1. The voltage level vSSL+vthofs1 may be a voltage level for detecting a threshold voltage distribution of the string select transistor SST_c. When the string select line SSL_o is a selected string select line, the voltage level of the check voltage may be vSSL+vthofs1+vthofs2. The voltage level vSSL+vthofs1+vthofs2 may be a voltage level for detecting a threshold voltage distribution of the string select transistor SST_o.

For example, by applying check voltages having different levels to the string select lines SSL_o, SSL_c, and SSL_i, the threshold voltages of the string select transistors SST_o, SST_c, and SST_i may be checked.

During the sensing operation, the pass voltage Vpass may be applied to the word lines and may be greater than the threshold voltage of memory cells.

A recovery operation may be performed between time t1 and time t2. During the recovery operation, the voltages of the string select lines SSL_o, SSL_c, and SSL_i and the voltages of the word lines may be recovered to initial voltages.

Figure 20:
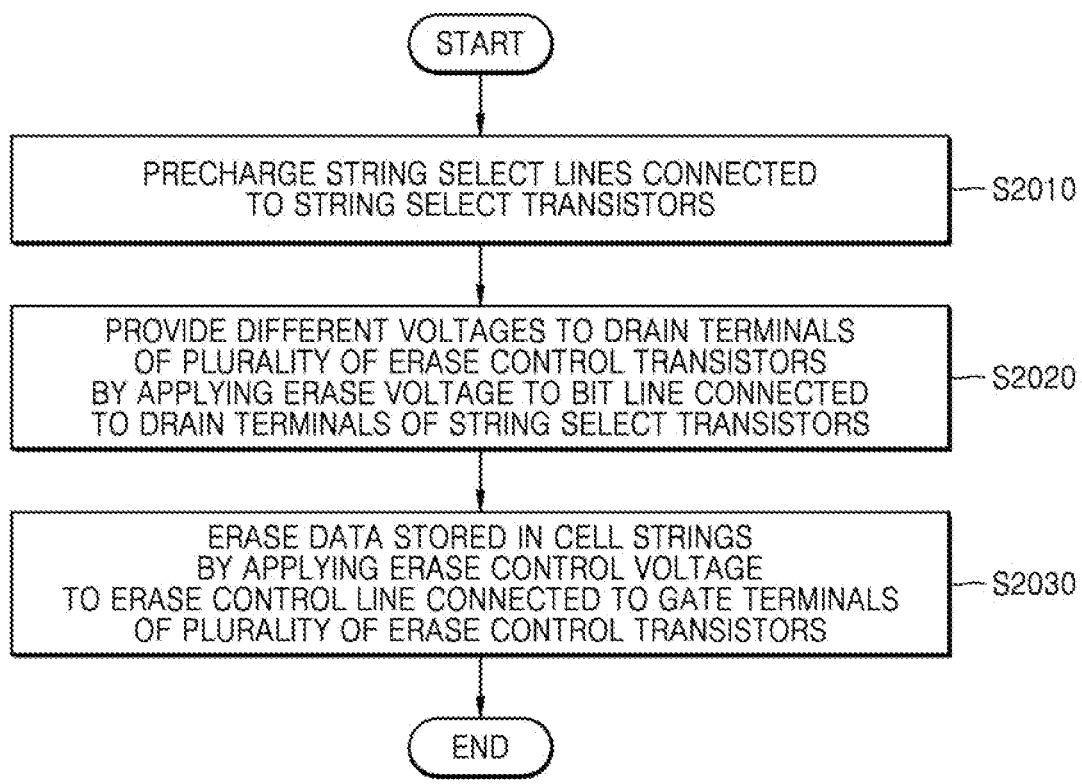
FIG. 20 is a flowchart illustrating a method of operating a memory device, according to an embodiment.

FIG. 20 is a flowchart illustrating a method of operating a memory device, according to an embodiment. FIG. 20 is described below with reference to FIGS. 8, 11, and 12.

During an erase operation, the memory device 100' may precharge the string select lines SSL_o, SST_c, and SST_i connected to the string select transistors SST_o, SST_c, and SST_i at operation S2010. For example, the voltage generator 120 may provide the precharge voltage Vpre to the string select line driving signal lines SS_o, SS_c, and SS_i to thereby transfer the precharge voltage Vpre to the string select lines SSL_o, SSL_c, and SSL_i through the pass transistors PTo, PTc, and PTi.

The memory device 100' may provide different voltages to drain terminals of the plurality of erase control transistors GDT1, GDT2, and GDT3 by applying an erase voltage Vers to a bit line BL connected to drain terminals of the string select transistors SST_o, SST_c, and SST_i at operation S2020. For example, referring to FIG. 8, a voltage obtained by subtracting the third threshold voltage Vth3 of the string select transistor SST_o from the erase voltage Vers may be provided to the drain terminal of the first erase control transistor GDT1. A voltage obtained by subtracting the second threshold voltage Vth2 of the string select transistor SST_c from the erase voltage Vers may be provided to the drain terminal of the second erase control transistor GDT2. A voltage obtained by subtracting the first threshold voltage Vth1 of the string select transistor SST_i from the erase voltage Vers may be provided to the drain terminal of the third erase control transistor GDT3.

The memory device 100' may erase data stored in the cell strings CS_o, CS_c, and CS_i by applying an erase control voltage to an erase control line GIDL_SS connected to the gate terminals of the plurality of erase control transistors GDT1 to GDT3 at operation S2030. For example, GIDL current may be generated by the plurality of erase control transistors GDT1 to GDT3, and data stored in the cell strings CS_o, CS_c, and CS_i may be erased by the GIDL current.

Figure 21:
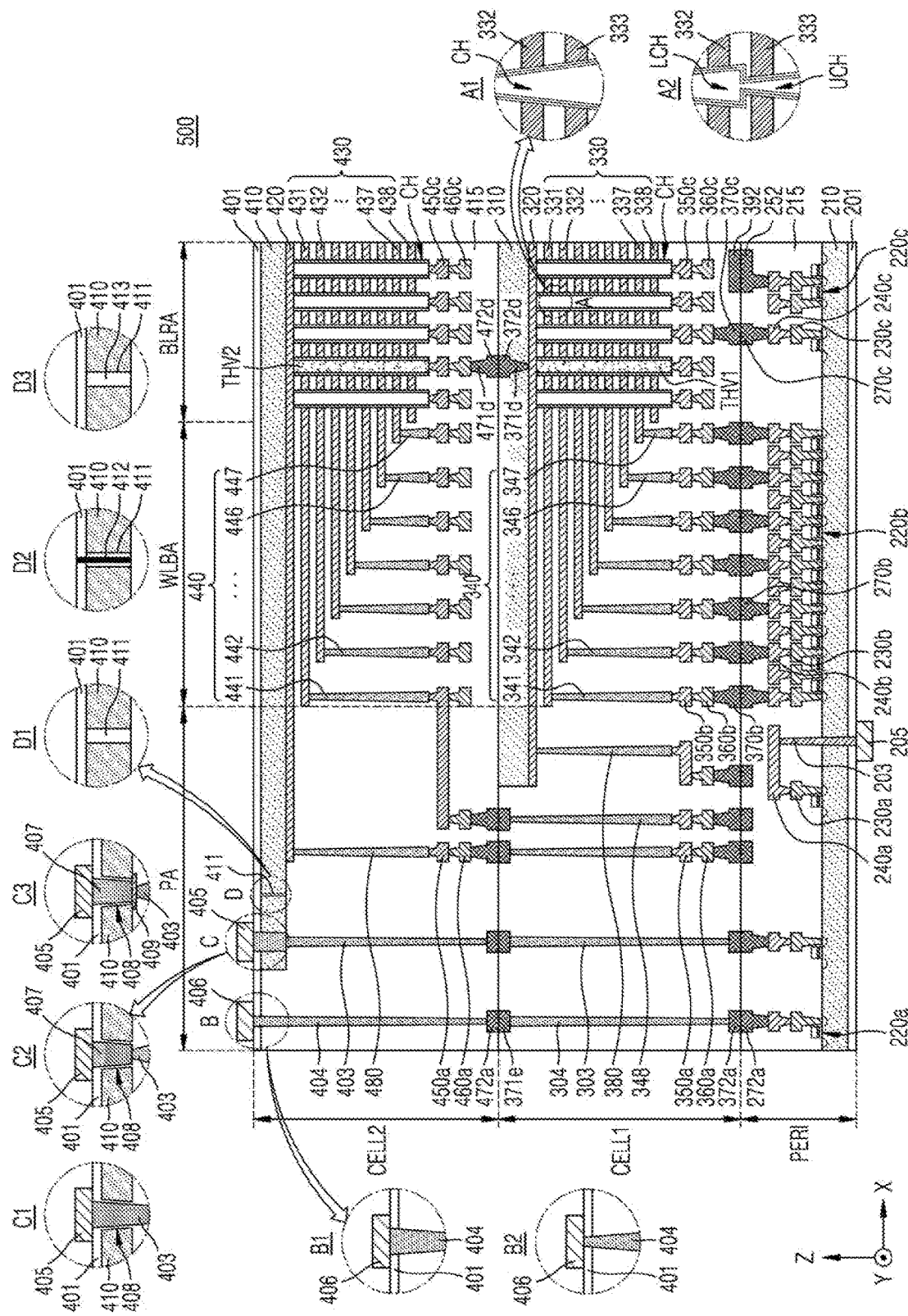
FIG. 21 is a view illustrating a memory device according to an embodiment.

FIG. 21 is a view illustrating a memory device 500 according to some embodiments.

Referring to FIG. 21, the memory device 500 may have a chip-to-chip (C2C) structure. At least one upper chip including a cell region and a lower chip including a peripheral circuit region PERI may be manufactured separately, and then the at least one upper chip and the lower chip may be connected to each other by a bonding method to form the C2C structure. For example, the bonding method may refer to a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. In some embodiments, the bonding metal patterns may be formed of aluminum (Al) or tungsten (W).

The memory device 500 may include the at least one upper chip including the cell region. For example, as illustrated in FIG. 21, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips may be defined based on before each of the first and second upper chips is turned over. For example, an upper portion of the lower chip may mean an upper portion defined based on a +Z-axis direction, and the upper portion of each of the first and second upper chips may mean an upper portion defined based on a −Z-axis direction in FIG. 21. However, embodiments are not limited thereto. In some embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments are not limited thereto. In some embodiments, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240*a*, 240*b* and 240*c*.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (e.g., word lines 331 to 338) may be stacked on the second substrate 310 in a direction (i.e., the Z-axis direction) perpendicular to a top surface of the second substrate 310. String select lines and a ground select line may be disposed on and under the word lines 330, and the plurality of word lines 330 may be disposed between the string select lines and the ground select line. Likewise, the second cell region CELL2 may include a third substrate 410 and a common source line 420, and a plurality of word lines 430 (e.g. word lines 431 to 438) may be stacked on the third substrate 410 in a direction (e.g., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 310 to penetrate the word lines 330, the string select lines, and the ground select line. The channel structure CH may include a data storage layer, a channel layer, and a filling insulation layer. The channel layer may be electrically connected to a first metal line 350*c* and a second metal line 360*c* in the bit line bonding region BLBA. For example, the second metal line 360*c* may be a bit line and may be connected to the channel structure CH through the first metal line 350*c*. The bit line (e.g., the second metal line 360*c*) may extend in a first direction (e.g., a Y-axis direction) parallel to the top surface of the second substrate 310.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350*c* and the second metal line 360*c*. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. In some embodiments, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region 'A2'. However, embodiments are not limited thereto. In some embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 21, the first through-electrode THV1 may penetrate the common source line 320 and the plurality of word lines 330. In some embodiments, the first through-electrode THV1 may further penetrate the second substrate 310. The first through-electrode THV1 may include a conductive material. In some embodiments, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372*d* and a second through-metal pattern 472*d*. The first through-metal pattern 372*d* may be formed at a bottom end of the first upper chip including the first cell region CELL1, and the second through-metal pattern 472*d* may be formed at a top end of the second upper chip including the second cell region CELL2. The first through-electrode THV1 may be electrically connected to the first metal line 350*c* and the second metal line 360*c*. A lower via 371*d* may be formed between the first through-electrode THV1 and the first through-metal pattern 372*d*, and an upper via 471*d* may be formed between the second through-electrode THV2 and the second through-metal pattern 472*d*. The first through-metal pattern 372*d* and the second through-metal pattern 472*d* may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line (e.g., the second metal line 360c) may be electrically connected to a page buffer included in the peripheral circuit region PERI. For example, some of the circuit elements 220c of the peripheral circuit region PERI may constitute the page buffer, and the bit line (e.g., the second metal line 360c) may be electrically connected to the circuit elements 220c included in the page buffer through an upper bonding metal pattern 370c of the first cell region CELL1 and an upper bonding metal pattern 270c of the peripheral circuit region PERI.

Referring still to FIG. 21, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (e.g., cell contact plugs 341 to 347). First metal lines 350b and second metal lines 360b may be sequentially connected onto the plurality of cell contact plugs 340 connected to the word lines 330. In the word line bonding region WLBA, the plurality of cell contact plugs 340 may be connected to the peripheral circuit region PERI through upper bonding metal patterns 370b of the first cell region CELL1 and upper bonding metal patterns 270b of the peripheral circuit region PERI.

The plurality of cell contact plugs 340 may be electrically connected to a row decoder included in the peripheral circuit region PERI. For example, some of the circuit elements 220b of the peripheral circuit region PERI may constitute the row decoder, and the plurality of cell contact plugs 340 may be electrically connected to the circuit elements 220b included in the row decoder through the upper bonding metal patterns 370b of the first cell region CELL1 and the upper bonding metal patterns 270b of the peripheral circuit region PERI. In some embodiments, an operating voltage of the circuit elements 220b included in the row decoder may be different from an operating voltage of the circuit elements 220c included in the page buffer. For example, the operating voltage of the circuit elements 220c included in the page buffer may be greater than the operating voltage of the circuit elements 220b included in the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (e.g., cell contact plugs 441 to 447). The plurality of cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Likewise, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 may be connected to the upper metal pattern 272a of the peripheral circuit region PERI by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 21, a lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In some embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. For example, a diameter of the channel structure CH shown in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In some embodiments, as illustrated in a region 'B2', the third input/output contact plug 404 may extend in the third direction (e.g., the Z-axis direction), and a diameter of the third input/output contact plug 404 may become progressively less toward the upper insulating layer 401. For example, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In some embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments are not limited thereto, and in some embodiments, the diameter of the second input/output contact plug 403 may become progressively less toward the second input/output pad 405.

In some embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In some embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. In some embodiments, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

Meanwhile, in some embodiments, a slit 411 may be formed in the third substrate 410. For example, the slit 411 may be formed at a particular position of the external pad bonding region PA. For example, as illustrated in a region 'D', the slit 411 may be located between the second input/output pad 405 and the cell contact plugs 440 in a plan view. In some embodiments, the second input/output pad 405 may be located between the slit 411 and the cell contact plugs 440 in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments are not limited thereto, and in certain embodiments, the slit 411 may be formed to have a depth ranging from about 60% to about 70% of a thickness of the third substrate 410.

In some embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In some embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

In some embodiments, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Similarly, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

In embodiments, memory cell array 110 of FIG. 2 may be disposed on the first cell region CELL1 and/or the second cell region CELL2, and the peripheral circuit 220 of FIG. 2 may be disposed on the peripheral circuit region PERI.

While some embodiments have been particularly shown and described, it will be understood that various changes in form and details may be made therein without departing from the spirit and scope of the following claims.

What is claimed is:

1. A memory device comprising:
a memory cell array comprising a plurality of memory blocks;
a voltage generator configured to generate an erase voltage and row line voltages to be provided to a target block of the plurality of memory blocks on which an erase operation is to be performed; and
a control logic circuit configured to control the memory cell array and the voltage generator,
wherein, during the erase operation, after a precharge voltage is applied to a plurality of string select lines connected to the target block, the voltage generator is further configured to provide the erase voltage to a plurality of bit lines connected to the plurality of string select lines,
wherein the plurality of string select lines comprises a first string select line and a second string select line,
wherein a first distance between the first string select line and ends of a plurality of word lines connected to the target block is less than a second distance between the second string select line and the ends of the plurality of word lines, and
wherein a first threshold voltage of a first transistor connected to the first string select line is higher than a second threshold voltage of a second transistor connected to the second string select line.

2. The memory device of claim 1, wherein the first string select line and the second string select line are configured to be floated after the first string select line and the second string select line are precharged.

3. The memory device of claim 1, wherein, during a program operation for the target block, while a program voltage is applied to the plurality of word lines, the voltage generator is further configured to provide a first voltage to the first string select line, and to provide a second voltage which is lower than the first voltage to the second string select line.

4. The memory device of claim 1, wherein, during an operation to check the first threshold voltage of the first transistor and the second threshold voltage of the second transistor, the voltage generator is further configured to provide a first voltage to the first string select line, and to provide a second voltage to the second string select line,
wherein a difference between the second voltage and the first voltage is equal to a difference between the second threshold voltage and the first threshold voltage.

5. The memory device of claim 1, wherein, based on the precharge voltage being applied to the plurality of string select lines, the voltage generator is further configured to provide a first precharge voltage to the first string select line, and to provide a second precharge voltage to the second string select line,
wherein the first precharge voltage is lower than the second precharge voltage.

6. The memory device of claim 1, wherein, during a read operation for the target block, the voltage generator is further configured to provide a first pulse voltage having a first voltage level to the first string select line during a first time period, and to provide a second pulse voltage having a second voltage level to the second string select line for a second time period,
wherein the first time period is greater than the second time period.

7. The memory device of claim 6, wherein the first voltage level is greater than the second voltage level.

8. The memory device of claim 1, wherein the first transistor is configured to provide a first voltage, which is obtained by subtracting the first threshold voltage from the erase voltage, to a terminal of a first erase control transistor which is connected in series with the first transistor, and
wherein the second transistor is configured to provide a second voltage, which is obtained by subtracting the second threshold voltage from the erase voltage, to a terminal of a second erase control transistor which is connected in series with the second transistor.

9. The memory device of claim 8, wherein, during the erase operation, a voltage difference between a voltage of a gate terminal of the first erase control transistor and a voltage of the terminal of the first erase control transistor is less than a voltage difference between a voltage of a gate terminal of the second erase control transistor and a voltage of the terminal of the second erase control transistor.

10. The memory device of claim 1, further comprising a first pass transistor between the voltage generator and a gate terminal of the first transistor and a second pass transistor between the voltage generator and a gate terminal of the second transistor,
wherein the first pass transistor is configured to transfer the precharge voltage to the gate terminal of the first transistor, and the second pass transistor is configured to transfer the precharge voltage to the gate terminal of the second transistor, based on a voltage level of a block select line,
wherein, based on the first pass transistor and the second pass transistor being turned off, the precharge voltage maintains a predetermined level.

11. A method of operating a memory device including a memory block which includes a plurality of cell strings connected to a plurality of word lines formed in a vertical direction on a substrate, the method comprising:
precharging a plurality of string select lines connected to gate terminals of a plurality of string select transistors and horizontally adjacent to each other between word line cut regions, wherein the plurality of string select transistors have different threshold voltages;
providing different voltages to first terminals of a plurality of erase control transistors connected to second terminals of the plurality of string select transistors, by applying an erase voltage to a plurality of bit lines connected to first terminals of the plurality of string select transistors; and
erasing data of the plurality of cell strings by applying an erase control voltage to gate terminals of the plurality of erase control transistors,
wherein the plurality of string select lines comprises a first string select line and a second string select line, wherein a first distance between the first string select line and ends of the plurality of word lines is less than a second distance between the second string select line and the ends of the plurality of word lines, and wherein a first threshold voltage of a first string select transistor connected to the first string select line is higher than a second threshold voltage of a second string select transistor connected to the second string select line.

12. The method of claim 11, wherein the providing of the different voltages to the first terminals of the plurality of erase control transistors comprises providing voltages obtained by subtracting threshold voltages of the plurality of string select transistors from the erase voltage to the first terminals of the plurality of erase control transistors.

13. The method of claim 12, wherein during a program operation, the method further comprises:
applying a first voltage to the first string select line while a program voltage is applied to word lines connected to the plurality of cell strings; and
applying a second voltage which is lower than the first voltage to the second string select line while the program voltage is applied to the word lines.

14. The method of claim 11, wherein during a read operation, the method further comprises:
applying a first pulse voltage having a first voltage level to the first string select line during a first time period; and
applying a second pulse voltage having a second voltage level to the second string select line during a second time period which is shorter than the first time period.

15. The method of claim 14, wherein the first voltage level is greater than the second voltage level.

16. A memory device comprising:
a plurality of word lines stacked on a substrate in a vertical direction, and extending between word line cut regions;
a plurality of erase control lines on the plurality of word lines;
a plurality of string select lines on the plurality of erase control lines, wherein the plurality of string select lines comprises first string select lines which are closer to the word line cut regions than second string select lines included in the plurality of string select lines; and
a memory cell array comprising a plurality of memory cells connected to the plurality of word lines, a plurality of erase control transistors connected to the plurality of erase control lines, and a plurality of string select transistors connected to the plurality of string select lines,
wherein a first threshold voltage of first string select transistors connected to the first string select lines from among the plurality of string select transistors is higher than a second threshold voltage of second string select transistors connected to the second string select lines from among the plurality of string select transistors.

17. The memory device of claim 16, wherein, during an erase operation performed on the memory cell array, an erase voltage provided to bit lines connected to the plurality of string select lines is also provided to first terminals of the plurality of erase control transistors through the plurality of string select transistors, and
wherein a first voltage of first terminals of first erase control transistors connected to the first string select transistors from among the plurality of erase control transistors is lower than a second voltage of first terminals of second erase control transistors connected to the second string select transistors from among the plurality of erase control transistors.

18. The memory device of claim 16, wherein, during a program operation performed on the memory cell array, while a program voltage is applied to the plurality of word lines, a first voltage is applied to the first string select lines, and a second voltage which is lower than the first voltage is applied to the second string select lines.

19. The memory device of claim 16, wherein, during a read operation for the memory cell array, a pulse voltage having a first voltage level is applied to the first string select lines during a first time period, and a pulse voltage having a second voltage level is applied to the second string select lines during a second time period,
wherein the first voltage level is greater than the second voltage level.

20. The memory device of claim 19, wherein the first time period is longer than the second time period.

* * * * *